US010079635B1

(12) United States Patent
Vos et al.

(10) Patent No.: US 10,079,635 B1
(45) Date of Patent: Sep. 18, 2018

(54) NETWORK CAPACITY MANAGEMENT

(71) Applicant: X Development LLC, Mountain View, CA (US)

(72) Inventors: David Vos, Mountain View, CA (US); Andrew Patton, Mountain View, CA (US); Sean Mullaney, Mountain View, CA (US); Behnam Motazed, Mountain View, CA (US); Siegfried Zerweckh, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/915,547

(22) Filed: Mar. 8, 2018

Related U.S. Application Data

(63) Continuation of application No. 15/336,376, filed on Oct. 27, 2016, now Pat. No. 9,948,380.

(60) Provisional application No. 62/315,128, filed on Mar. 30, 2016, provisional application No. 62/325,080, filed on Apr. 20, 2016.

(51) Int. Cl.
*H04W 84/00* (2009.01)
*H04B 7/185* (2006.01)

(52) U.S. Cl.
CPC ....... *H04B 7/18506* (2013.01); *H04W 84/005* (2013.01)

(58) Field of Classification Search
CPC ......... H04W 72/0413; H04W 72/0453; H04W 84/005; H04W 76/10; H04W 88/02; H04W 88/08; H04W 24/02; H04W 40/026; H04W 48/20; H04W 4/02; H04W 4/046; H04W 4/06
See application file for complete search history.

(56) References Cited

U.S. PATENT DOCUMENTS

| | | | |
|---|---|---|---|
| 2016/0028471 A1* | 1/2016 | Boss | H04W 84/06 455/406 |
| 2017/0013476 A1* | 1/2017 | Suthar | H04W 24/02 |

* cited by examiner

*Primary Examiner* — Kwasi Karikari
(74) *Attorney, Agent, or Firm* — McDonnell Boehnen Hulbert & Berghoff LLP

(57) ABSTRACT

An example embodiment may involve receiving a request to provide unmanned aerial vehicle (UAV) based wireless coverage to a particular geographical location. Possibly in response to the request, a UAV may fly to the particular geographical location. A first wireless interface of the UAV may define a wireless coverage area that covers at least part of the particular geographical location. A second wireless interface of the UAV may establish a wireless backhaul link to a data network. The UAV may provide wireless data transfer services to at least one device in the particular geographical location, where the wireless data transfer services allow the device to exchange data communication with the data network via the UAV.

20 Claims, 24 Drawing Sheets

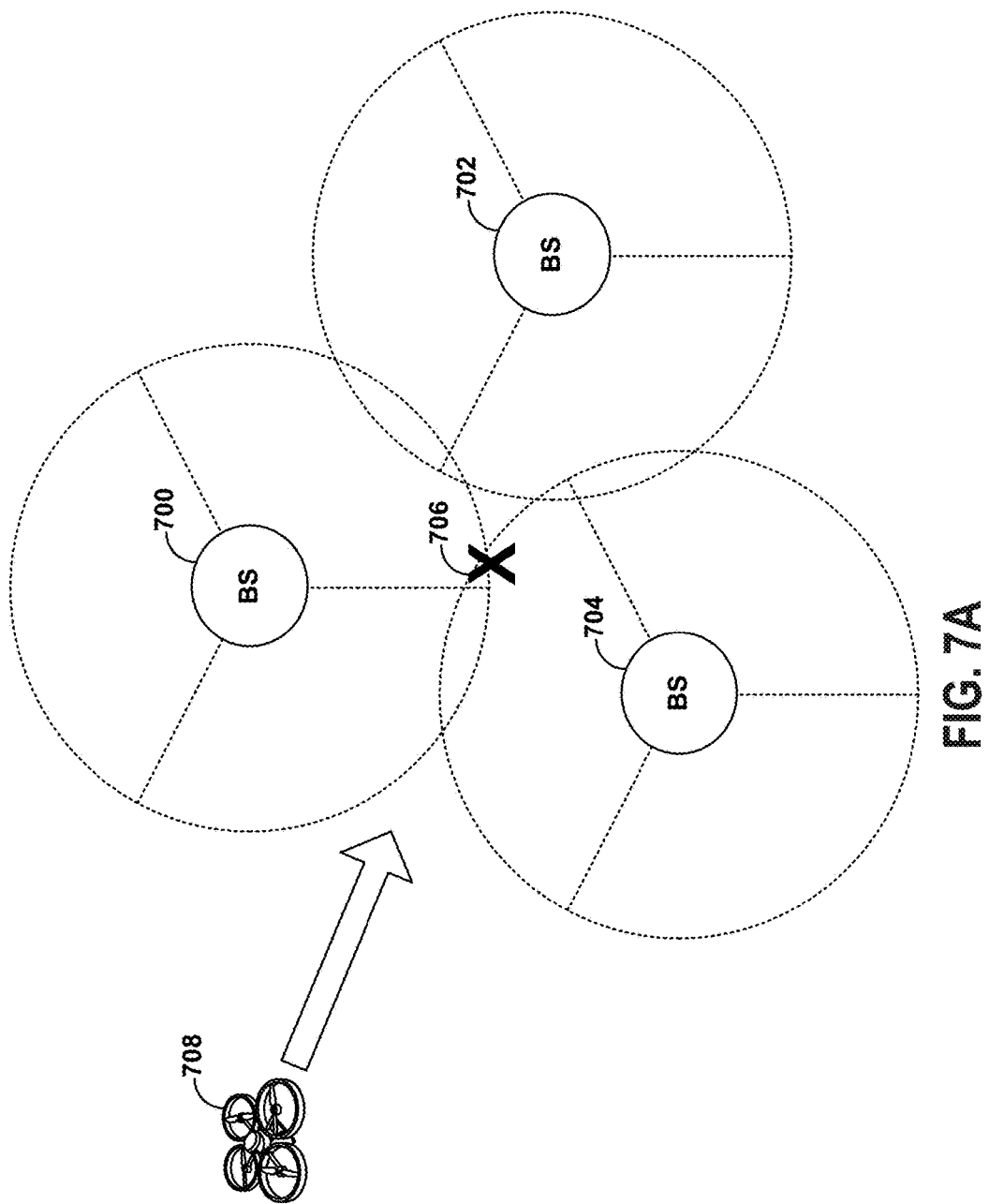

NETWORK CAPACITY MANAGEMENT

CROSS-REFERENCE TO RELATED APPLICATIONS

This application is a continuation of and claims priority to U.S. patent application Ser. No. 15/336,376, filed Oct. 27, 2016. U.S. patent application Ser. No. 15/336,376 claims priority to U.S. provisional patent application Nos. 62/315,128, filed Mar. 30, 2016, and 62/325,080, filed Apr. 20, 2016, which are hereby incorporated by reference in their entirety.

BACKGROUND

Current network infrastructure design is based on the assumption that devices may be fixed or mobile, but the equipment that provides wireless services to these devices (e.g., routers, cable modem termination systems, digital subscriber line access multiplexers, or wireless base stations) are generally fixed. Thus, there is an inherent maximum amount of network capacity (measured in upstream and/or downstream bits per second) available to the devices. Further, some devices may be subscribed to a wireless service provider according to a plan that supports a maximum upstream and/or downstream rate that is capped at less than this inherent maximum amount.

Nonetheless, data transmissions are often bursty—a device may use up to 100% of its available capacity for a short period of time, but otherwise remain relatively idle. As a consequence, the device is not able to obtain full utilization of its network capacity. Indeed, many network service providers overprovision their subscribers, resulting in much of their network capacity being used inefficiently. Nonetheless, in some cases, the device would benefit from more capacity than is available.

SUMMARY

One possible way of improving the efficiency of how network capacity is provided to devices is through the use of unmanned vehicles that serve as backhaul relays between these devices and other networks such as the Internet.

An unmanned vehicle, which may also be referred to as an autonomous vehicle, is a vehicle capable of travel without a physically-present human operator in the vehicle. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle with commands that are sent to the unmanned vehicle via a wireless link. Alternatively, the pilot or driver may be near the unmanned vehicle (e.g., next to or below it). When the unmanned vehicle operates in autonomous mode, the unmanned vehicle typically moves based on pre-programmed navigation waypoints, dynamic automation systems, or a combination of both. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects.

Various types of unmanned vehicles exist for various different environments. For instance, unmanned vehicles exist for operation in the air, on the ground, underwater, and in space. Examples include quad-copter and tail-sitter unmanned aerial vehicles (UAVs), among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

The embodiments herein are generally focused on using autonomous UAVs to provide on-demand information transfer capacity to one or more devices. Nonetheless, other types of unmanned vehicles, such as unmanned water-based vehicles, may be used instead.

Accordingly, a first example embodiment may involve receiving a request to provide UAV based wireless coverage to a particular geographical location. Possibly in response to the request, a UAV may fly to the particular geographical location. A first wireless interface of the UAV may define a wireless coverage area that covers at least part of the particular geographical location. A second wireless interface of the UAV may define a wireless backhaul link to a data network. The UAV may provide wireless data transfer services to at least one client device in the particular geographical location. The wireless data transfer services may allow the client device to exchange data communication with the data network via the UAV.

A second example embodiment may involve receiving, by a UAV controller device, a request to provide UAV based wireless coverage to a particular geographical location. Possibly in response to the request, the UAV controller device may cause: (i) a UAV to fly to the particular geographical location, (ii) a first wireless interface of the UAV to define a wireless coverage area that covers at least part of the particular geographical location, (iii) a second wireless interface of the UAV to establish a wireless backhaul link to a data network, and (iv) the UAV to provide wireless data transfer services to at least one client device in the particular geographical location. The wireless data transfer services may allow the client device to exchange data communication with the data network via the UAV.

A third example embodiment may involve receiving a request for wireless coverage at a particular geographical location. Possibly based on the particular geographical location, a particular UAV may be selected to carry out the request. The particular UAV may be instructed to fly to the particular geographical location and provide the requested wireless coverage to one or more client devices.

A fourth example embodiment may involve flying, by a UAV, to a particular geographical location. A wireless router may be at the particular geographical location. The UAV may detect a wireless coverage area defined by the wireless router. The UAV may access the wireless coverage area using a network identifier and a password. The UAV may establish a backhaul link to a data network. The UAV may transmit a notification to a client device served by the wireless coverage area, where the notification indicates that the UAV serves as a default gateway for the wireless coverage area. The UAV may exchanging data transmissions between (i) the client device, and (ii) one or more other devices accessible via the data network.

A fifth example embodiment may involve flying, by a UAV, to a particular geographical location. A wireless router may be at the particular geographical location. The UAV may detect a wireless coverage area defined by the wireless router. The UAV may access the wireless coverage area using a network identifier and a password. The UAV may transmit a notification to a client device served by the wireless coverage area, where the notification indicates that the UAV has access to media content requested by the client device. The UAV may download the requested media content to the client device. In this embodiment, backhaul to a data network is not required.

A sixth example embodiment may involve a UAV flying to a particular geographical location. A wireless device may be at the particular geographical location. The wireless device may define a first wireless coverage area and provide backhaul communication between the first wireless coverage area and a data network. A first interface of the UAV may access the first wireless coverage area. A second interface the UAV may device a second wireless coverage area. The second wireless coverage area may cover a client device that is not within range of the first wireless coverage area. The UAV may exchange data transmissions between (i) the client device, and (ii) one or more other devices accessible via the data network.

A seventh example embodiment may involve a UAV flying to a particular geographical location. A wireless router may be at the particular geographical location, and the wireless router may be providing, via a first wireless network, a client device with connectivity to a data network. The UAV may define a second wireless network. The UAV may also transmit a notification of the second wireless network to a server device. Reception of the notification may cause the server device to transmit operational parameters of the second wireless network to the client device. The UAV may exchange, via the second wireless network, data transmissions with the client device.

An eighth example embodiment may involve a UAV flying to a particular geographical location. A client device may be in the vicinity of the particular geographical location, and the client device may be configured to use a first cellular wireless coverage area to communicate with a data network. The UAV may measure signal strengths of one or more cellular wireless coverage areas, including the first cellular wireless coverage area. The UAV may select a signal strength that is greater than any of the measured signal strengths. The UAV may define a second cellular wireless coverage area using the selected signal strength, which may cause the client device to be handed over from the first cellular wireless coverage area to the second cellular wireless coverage area. The UAV may exchange, via the second cellular wireless coverage area, data transmissions with the client device.

A ninth example embodiment may involve receiving a request for delivery of particular media content at a particular geographical location. Possibly based on the particular geographical location, a particular UAV from a plurality of UAVs may be selected to carry out the request. The particular UAV may be loaded with a portable storage device containing the particular media content. A command may be transmitted to the particular UAV. Reception of the command may cause the particular UAV to fly to the particular geographical location and deliver the portable storage device.

In a tenth example embodiment, an article of manufacture may include a non-transitory computer-readable medium, having stored thereon program instructions that, upon execution by a computing device or system, cause the computing device or system to perform operations in accordance with the first, second, third, fourth, fifth, sixth, seventh, eighth, and/or ninth example embodiments.

In an eleventh example embodiment, a computing device or system may include at least one processor, as well as data storage and program instructions. The program instructions may be stored in the data storage, and upon execution by the at least one processor may cause the computing device or system to perform operations in accordance with the first, second, third, fourth, fifth, sixth, seventh, eighth, and/or ninth example embodiments.

In an twelfth example embodiment, a system may include various means for carrying out each of the operations of the first, second, third, fourth, fifth, sixth, seventh, eighth, and/or ninth example embodiments.

Each of the above embodiments may be combined with one another, or any other aspects, features, or operations disclosed herein, in various ways. Thus, these embodiments may overlap with one another to some extent, or may be independent.

Regardless, these as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A depicts base stations each defining one or more wireless coverage areas, according to example embodiments.

DETAILED DESCRIPTION

Figure 1:
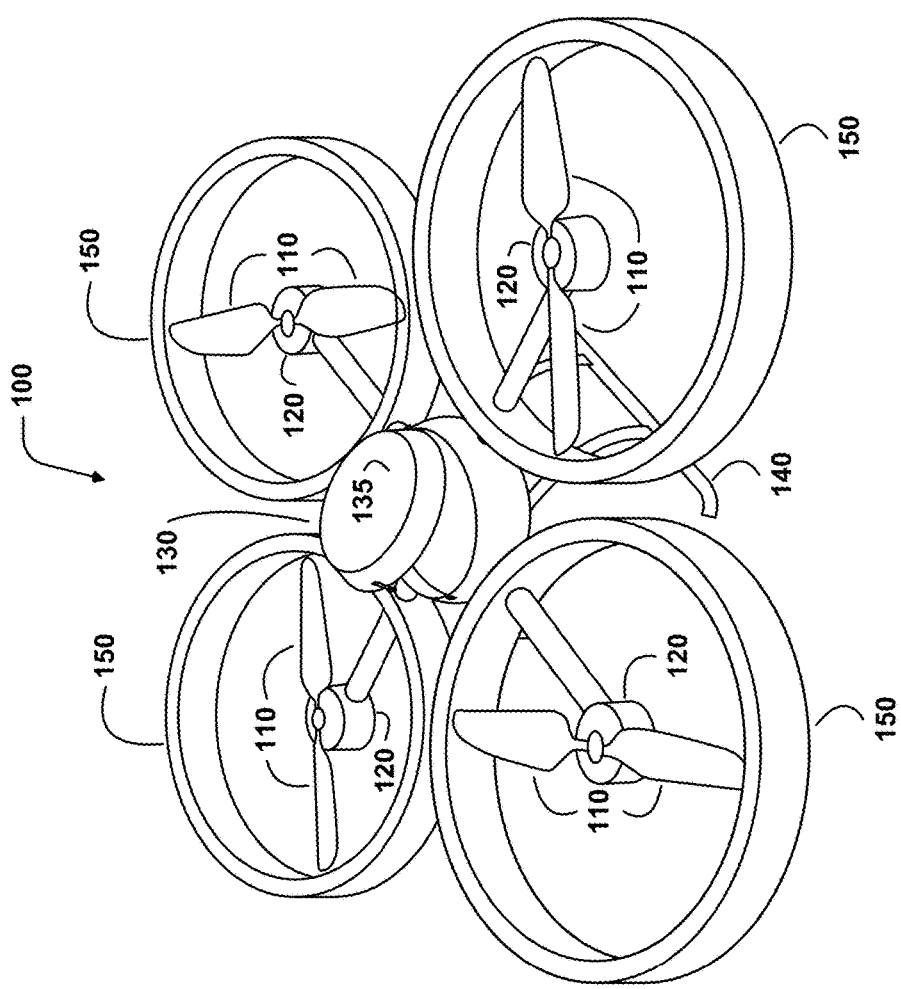
FIGS. 1, 2, 3A, and 3B are simplified illustrations of UAVs, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

As used herein, the term "client device" may refer to a device that can be served, directly or indirectly, by augmented data transfer provided from a UAV. A client device may be an end-user device, such as a personal computer, smartphone, tablet computer, or wearable computing device, but need not be limited to such types of devices. For instance, a device that otherwise acts as a server device may be a client device for purposes of the embodiments herein. Similarly, a client device can be an autonomous or semi-autonomous device that undertakes in little or no user interaction. In some embodiments, a client device might not have a wireless interface.

1. Example Unmanned Aerial Vehicles

Herein, the terms "unmanned aerial vehicle" and "UAV" refer to any vehicle that is capable of performing some functions without a physically-present human pilot. Examples of flight-related operations may include, but are not limited to, sensing its environment or operating in the air without a need for input from an operator, among others.

A UAV may be autonomous or semi-autonomous. For instance, some operations could be controlled by a remote human operator, while other operations are carried out autonomously. Further, a UAV may be configured to allow a remote operator to take over operations that can otherwise be controlled autonomously by the UAV. Yet further, a given type of operation may be controlled remotely at one level of abstraction and performed autonomously at another level of abstraction. For example, a remote operator could control high-level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such, the rotors may allow the multicopter 100 to take off and land vertically, to maneuver in any direction, and/or to hover. Furthermore, the pitch of the blades may be adjusted as a group and/or differentially, and may allow a multicopter 100 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself by adjusting the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, communication system(s) and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the speed and/or the direction that rotors 110 are spinning.

Figure 2:
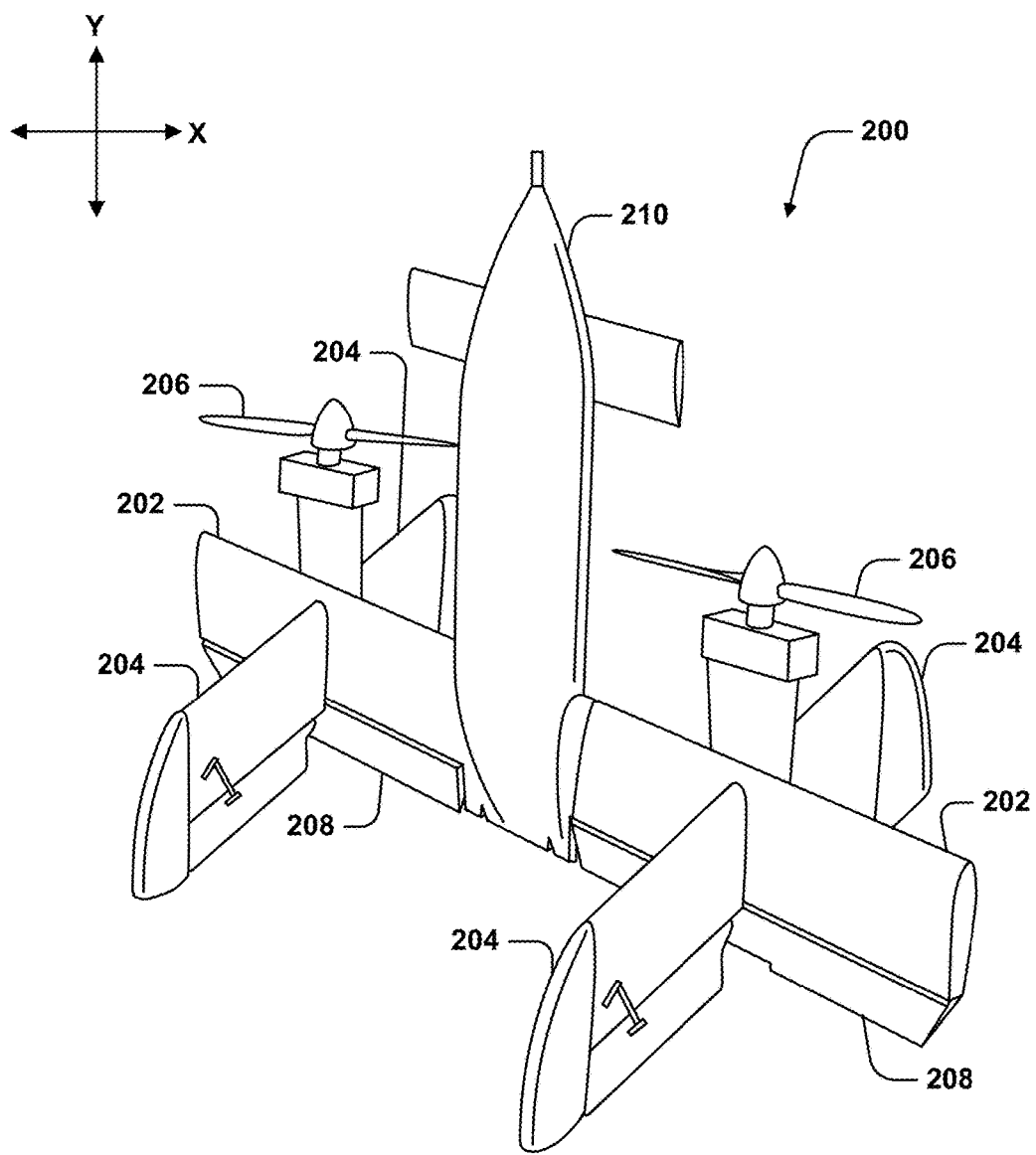

FIG. 2 is a simplified illustration of another UAV, according to an example embodiment. In particular, FIG. 2 shows an example of a tail-sitter UAV 200. In the illustrated example, tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3A and 3B are simplified illustrations of other types of UAVs, according to example embodiments.

Figure 3A:
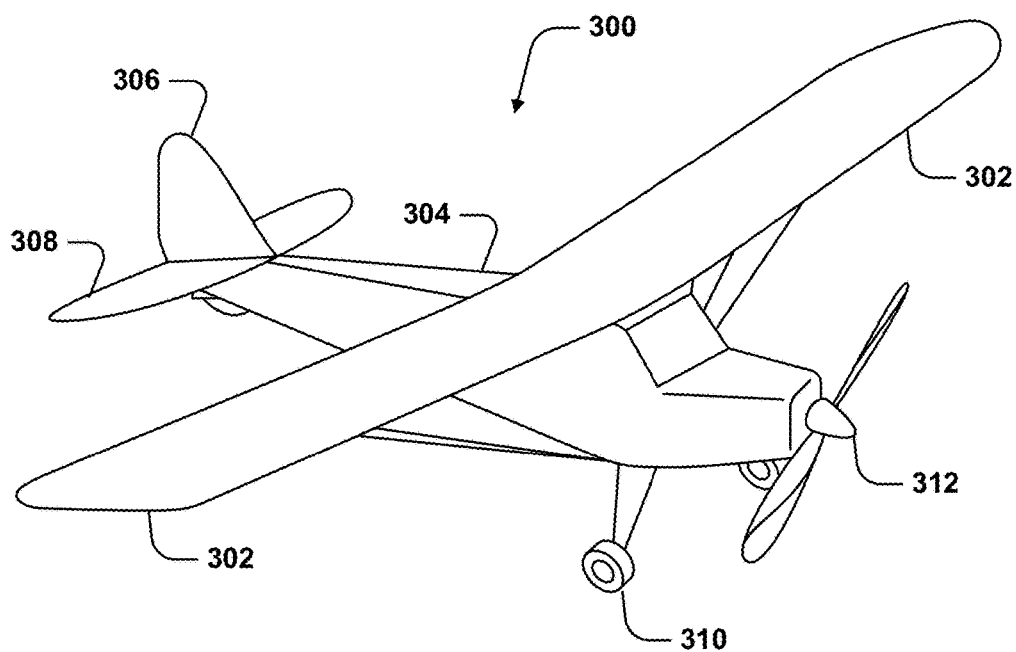

In particular, FIG. 3A shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3A depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 3B:
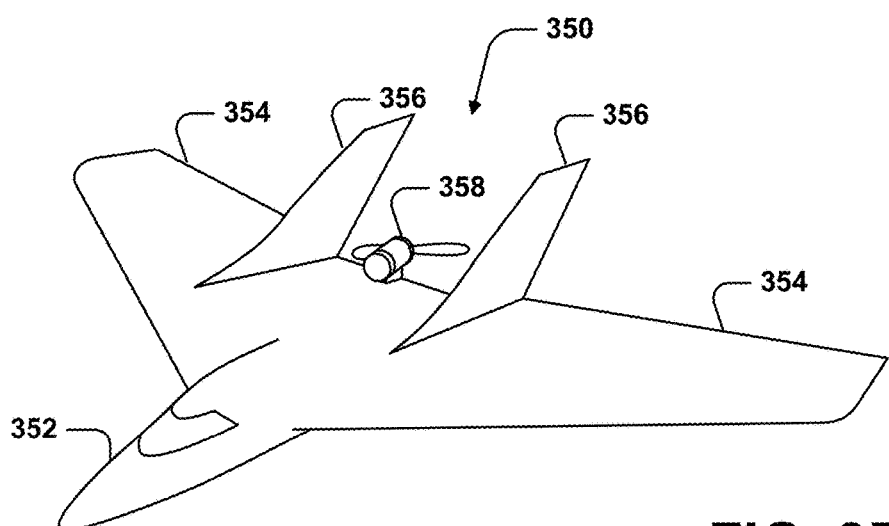

FIG. 3B shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3A, FIG. 3B depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail-sitter" UAV typically has fixed wings to provide lift and allow the UAV to glide, but also is configured to take off and land vertically on its own. Other examples of self-launching UAVs are also possible.

2. Example UAV Systems

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., much larger than the flight range of any single UAV).

Figure 4:
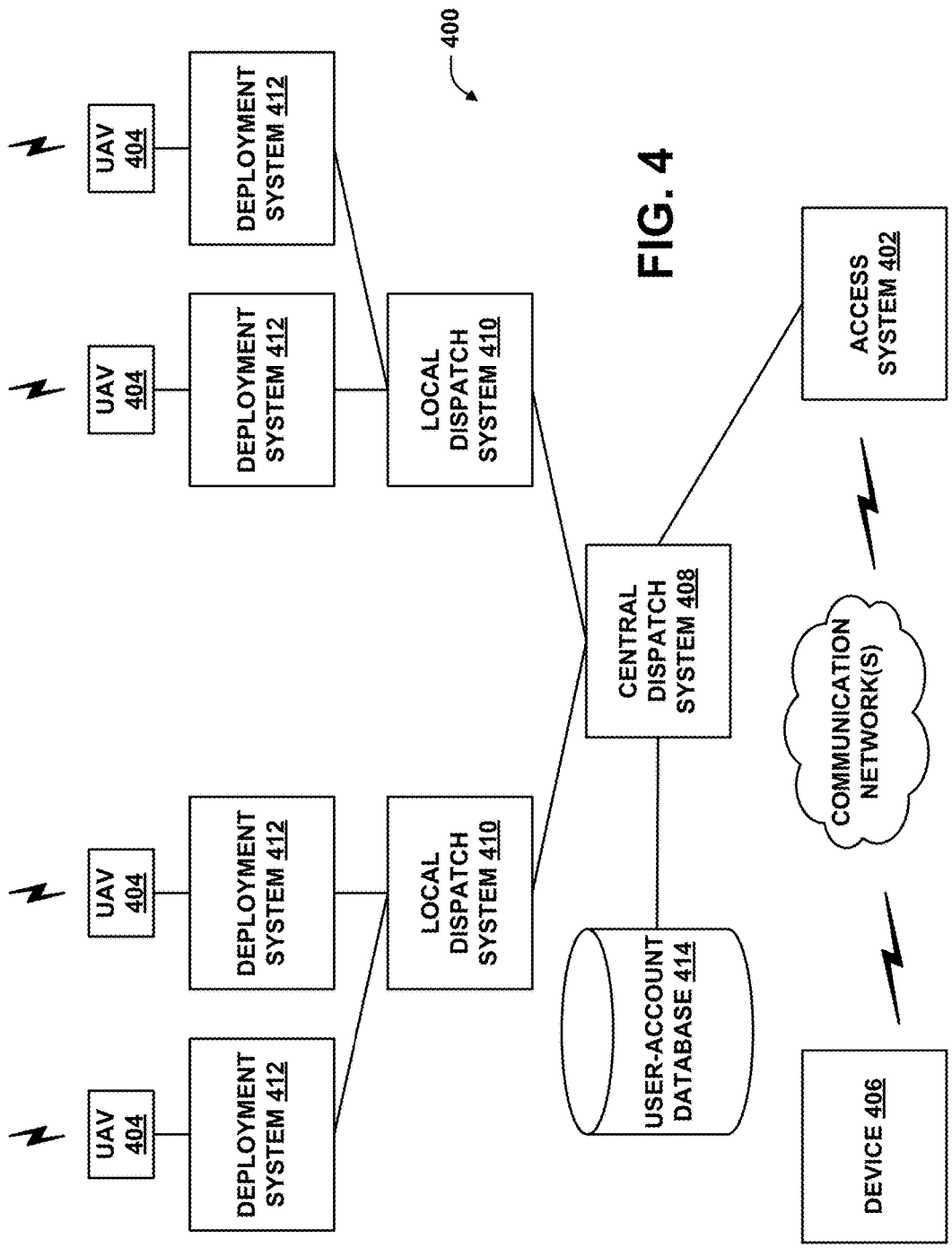
FIG. 4 is a simplified block diagram illustrating a network of UAVs, according to example embodiments.

For example, UAVs capable of carrying payloads or augmenting existing wireless services may be distributed at a number of launch sites across a large geographic area (possibly even throughout an entire country, or even worldwide), in order to deliver various items to locations throughout the geographic area. FIG. 4 is a simplified block diagram illustrating a distributed UAV system 400, according to an example embodiment.

In an illustrative UAV system 400, an access system 402 may allow for interaction with, control of, and/or utilization of a network of UAVs 404. In some embodiments, access system 402 may be a computing system that allows for human-controlled or automated dispatch of UAVs 404. As such, the control system may include or otherwise provide a user interface (UI) via which a user can access, control, or monitor UAVs 404.

Further, access system 402 may provide for remote operation of a UAV. For instance, access system 402 may allow an operator to control the flight of a UAV via the UI. As a specific example, an operator may use an access system to dispatch a UAV 404 to deliver a package or augmented wireless capacity to a target location. The UAV 404 may then autonomously navigate to the general area of the target location. At this point, the operator may use access system 402 to take over control of the UAV 404, and navigate the UAV to the target location (e.g., to the vicinity of one or more devices that may benefit from the augmented wireless capacity or the package delivery). Other examples of remote operation of a UAV are also possible.

In an illustrative embodiment, UAVs 404 may take various forms. For example, each UAV 404 may be a UAV such as those illustrated in FIGS. 1, 2, 3A, and 3B. However, UAV system 400 may also utilize other types of UAVs. In some implementations, all UAVs 404 may be of the same or a similar configuration. However, in other implementations, UAVs 404 may include a number of different types of UAVs. For instance, UAVs 404 may include a number of types of UAVs, with each type of UAV being configured for a different type or types of deployment.

In a further aspect, UAV system 400 may include or have access to a user-account database 414. User-account database 414 may include data for a number of user-accounts, and which are each associated with one or more persons. For a given user-account, user-account database 414 may include data related to or useful in providing UAV-related services. Typically, the user data associated with each user-account is optionally provided by an associated user and/or is collected with the associated user's permission.

Further, in some embodiments, a person may have to register for a user-account with the UAV system 400 in order to use or be provided with UAV-related services by the UAVs 404 of UAV system 400. As such, the user-account database 414 may include authorization information for a given user-account (e.g., a user-name and password), and/or other information that may be used to authorize access to a user-account.

In some embodiments, a person may associate one or more of their devices with their user-account, such that they can be provided with access to the services of UAV system 400. For example, when a person uses an associated mobile phone to, e.g., place a call to an operator of access system 402 or send a message requesting a UAV-related service to a dispatch system, the phone may be identified via a unique device identification number, and the call or message may then be attributed to the associated user-account. Other examples are also possible.

A device 406 may take various forms. Generally, a device 406 may be any device via which a direct or indirect request to dispatch a UAV can be made. (Note that an indirect request may involve any communication that may be responded to by dispatching a UAV). In example embodiments, device 406 may be a mobile phone, tablet computer, laptop computer, personal computer, or any network-connected computing device. Further, in some instances, device 406 might not be a computing device. As an example, a standard telephone, which allows for communication via plain old telephone service (POTS), may serve as device 406. Other types of remote devices are also possible.

Further, device 406 may be configured to communicate with access system 402 via one or more types of communication network(s). For example, device 406 could communicate with access system 402 (or via a human operator of the access system) by placing a phone call or transmitting data over a POTS network, a cellular network, and/or a data network such as the Internet. Other types of networks may also be utilized.

In some embodiments, device 406 may be configured to allow a user to request data transfer capacity. For example, a user could request UAV delivery of data (e.g., a flash drive, hard drive, memory card, etc.) to their home via their mobile phone, tablet, or laptop. As another example, a user could request augmented wireless service for device 406 and/or other devices. To provide such dynamic delivery, a UAV system 400 may receive location information (e.g., global positioning system (GPS) coordinates, etc.) from the user's mobile phone, or any other device on the user's person, such that a UAV can navigate to the user's location (as indicated by their mobile phone).

As noted, device 406 may be configured to determine and/or provide an indication of its own location. For example, device 406 may include a GPS transceiver so that it can include GPS location information (e.g., GPS coordinates) in a communication to an access system 402 and/or to a dispatch system such as central dispatch system 408. As another example, device 406 may use a technique that involves triangulation (e.g., between base stations in a cellular network) to determine its location. Alternatively, another system such as a cellular network may use a technique that involves triangulation to determine the location of a remote device 406, and then send a location message to the device 406 to inform the remote device of its location. In yet another alternative, device 406 may be associated with a fixed location (e.g., the home of a user of device 406), and this fixed location may be looked up via user-account database 414. Other location-determination techniques are also possible.

In an illustrative arrangement, central dispatch system 408 may be a server or group of servers, configured to receive dispatch messages requests and/or dispatch instructions from access system 402. Such dispatch messages may request or instruct the central dispatch system 408 to coordinate the deployment of UAVs to various target locations. A central dispatch system 408 may be further configured to route such requests or instructions to local dispatch systems 410. To provide such functionality, central dispatch system 408 may communicate with access system 402 via a data network, such as the Internet or a private network that is established for communications between access systems and automated dispatch systems.

In the illustrated configuration, central dispatch system 408 may be configured to coordinate the dispatch of UAVs 404 from a number of different local dispatch systems 410. As such, central dispatch system 408 may keep track of which UAVs 404 are located at which local dispatch systems 410, which UAVs 404 are currently available for deployment, and/or which services or operations for which each of the UAVs 404 is configured (in the event that a UAV fleet includes multiple types of UAVs configured for different services and/or operations). Additionally or alternatively, each local dispatch system 410 may be configured to track which of its associated UAVs 404 are currently available for deployment and/or which services or operations each of its associated UAVs is configured.

In some cases, when central dispatch system 408 receives a request for UAV-related service from an access system 402, central dispatch system 408 may select a specific UAV 404 to dispatch. The central dispatch system 408 may accordingly instruct the local dispatch system 410 that is associated with the selected UAV to dispatch the selected UAV. The local dispatch system 410 may then operate its associated deployment system 412 to launch the selected UAV. In other cases, a central dispatch system 408 may forward a request for a UAV-related service to a local dispatch system 410 that is near the location where the support is requested, and leave the selection of a particular UAV 404 to the local dispatch system 410. In situations where the selected UAV is already airborne and available to provide the requested service, central dispatch system 408 may direct this UAV to navigate to the target location and provide the service.

In an example configuration, a local dispatch system 410 may be implemented in a computing system at the same location as the deployment system or systems 412 that it controls. For example, in some embodiments, a local dispatch system 410 could be implemented by a computing system at a building where the deployment systems 412 and UAVs 404 that are associated with the particular local dispatch system 410 are also located. In other embodiments, a local dispatch system 410 could be implemented at a location that is remote to its associated deployment systems 412 and UAVs 404.

Numerous variations on and alternatives to the illustrated configuration of UAV system 400 are possible. For example, in some embodiments, a user of a remote device 406 could request service directly from a central dispatch system 408. To do so, an application may be implemented on a remote device 406 that allows the user to provide information regarding a requested service, and generate and send a data message to request that the UAV system provide the service. In such an embodiment, central dispatch system 408 may include automated functionality to handle requests that are generated by such an application, evaluate such requests, and, if appropriate, coordinate with an appropriate local dispatch system 410 to deploy a UAV.

Further, in some implementations, some or all of the functionality that is attributed herein to central dispatch system 408, local dispatch system(s) 410, access system 402, and/or deployment system(s) 412 could be combined in a single system, implemented in a more complex system, and/or redistributed among central dispatch system 408, local dispatch system(s) 410, access system 402, and/or deployment system(s) 412 in various ways.

Yet further, while each local dispatch system 410 is shown as having two associated deployment systems, a given local dispatch system 410 may have more or less associated deployment systems. Similarly, while central dispatch system 408 is shown as being in communication with two local dispatch systems 410, a central dispatch system may be in communication with more or less local dispatch systems 410.

In a further aspect, a deployment system 412 may take various forms. In general, a deployment system may take the form of or include a system for physically launching a UAV 404. Such a launch system may include features that allow for a human-assisted UAV launch and/or features that provide for an automated UAV launch. Further, a deployment system 412 may be configured to launch one particular UAV 404, or to launch multiple UAVs 404.

A deployment system 412 may further be configured to provide additional functions, including for example, diagnostic-related functions such as verifying system functionality of the UAV, verifying functionality of devices that are housed within a UAV, and/or maintaining devices or other items that are housed in the UAV.

In some embodiments, the deployment systems 412 and their corresponding UAVs 404 (and possibly associated local dispatch systems 410) may be strategically distributed throughout an area such as a city. For example, deployment systems 412 may be located on the roofs of certain private or municipal buildings which can thus serve as the dispatch locations for UAVs 404. However, deployment systems 412 (and possibly the local dispatch systems 410) may be distributed in other ways, depending upon the particular implementation.

3. Example Components of a UAV

Figure 5:
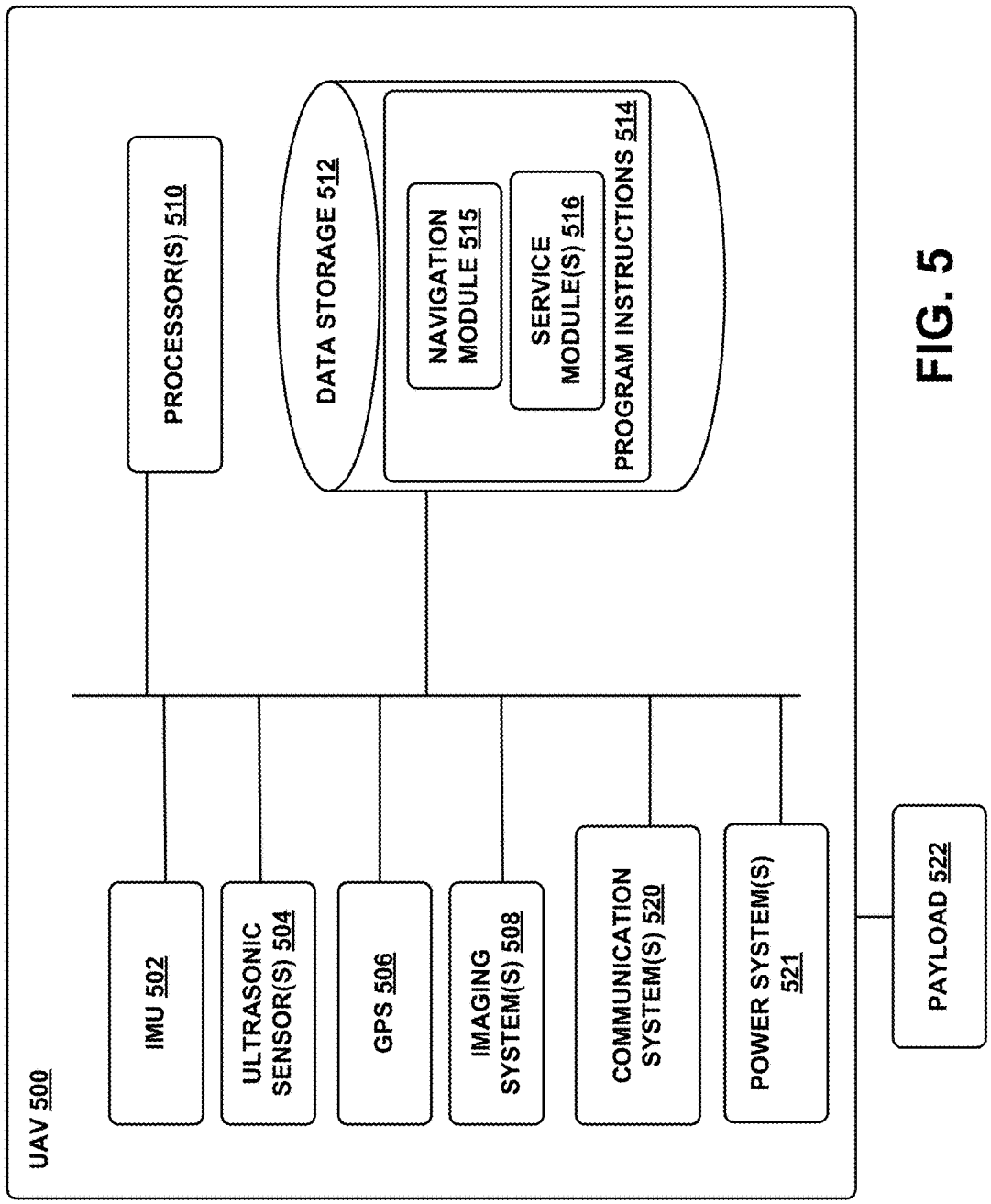
FIG. 5 is a simplified block diagram illustrating components of a UAV, according to example embodiments.

FIG. 5 is a simplified block diagram illustrating components of a UAV 500, according to an example embodiment. UAV 500 may take the form of or be similar in form to one of the UAVs 100, 200, 300, and 350 shown in FIGS. 1, 2, 3A, and 3B. However, a UAV 500 may also take other forms.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, GPS 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the operations of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the UAV 500. As such, the data storage 514 may include program instructions to perform or facilitate some or all of the UAV operations described herein. For instance, in the illustrated embodiment, program instructions 514 include a navigation module 515 and one or more service modules 516.

A. Sensors

In an illustrative embodiment, IMU 502 may include both an accelerometer and a gyroscope, which may be used together to determine the orientation of the UAV 500. In particular, the accelerometer can measure the orientation of the vehicle with respect to the Earth, while the gyroscope measures the rate of rotation around an axis. IMUs are commercially available in low-cost, low-power packages. For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of UAV 500. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 500, slight errors in measurement may compound over time and result in a more significant error. However, an example UAV 500 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, an infrared or forward-looking infrared (FLIR) system, and/or various types of cameras, among other possibilities.

UAV 500 also includes a GPS receiver 506. The GPS receiver 506 may be configured to provide data that is typical of GPS systems, such as the GPS coordinates of the UAV 500. Such GPS data may be utilized by the UAV 500 for various functions. As such, the UAV may use its GPS receiver 506 to help navigate a particular location, as indicated, at least in part, by the GPS coordinates of a device. Other examples are also possible.

UAV 500 may also include one or more imaging system(s) 508. For example, one or more still and/or video cameras may be utilized by a UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use imaging system 508 to help in determining location. For example, UAV 500 may capture imagery of its environment and compare it to what it expects to see in its environment given current estimated position (e.g., its current GPS coordinates), and refine its estimate of its position based on this comparison.

In a further aspect, UAV 500 may include one or more microphones. Such microphones may be configured to capture sound from the UAVs environment.

B. Navigation and Location Determination

The navigation module 515 may provide functionality that allows the UAV 500 to, e.g., move about in its environment and reach a desired location. To do so, the navigation module 515 may control the altitude and/or direction of flight by controlling the mechanical features of the UAV that affect flight (e.g., rotors 110 of UAV 100).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

For example, a UAV 500 may navigate using waypoints to the general area of a device to which service is to be provided. Such waypoints may be pre-determined based on GPS coordinates provided by a remote device at the target delivery location. The UAV may then switch to a mode in which it utilizes a localization process to locate and travel to a specific location of the device.

Various types of location-determination techniques may be used to accomplish localization of a device once a UAV 500 has navigated to the general area of the device. For instance, a UAV 500 may be equipped with one or more sensory systems, such as, for example, imaging system(s) 508, a directional microphone array (not shown), ultrasonic sensors 504, infrared sensors (not shown), and/or other sensors, which may provide input that the navigation module 515 utilizes to navigate autonomously or semi-autonomously to the specific location of a device.

As another example, once the UAV 500 reaches the general area of a target location (or of a moving subject such as a person or their mobile device), the UAV 500 may switch to a "fly-by-wire" mode where it is controlled, at least in part, by a remote operator, who can navigate the UAV 500 to the target location. To this end, sensory data from the UAV 500 may be sent to the remote operator to assist them in navigating the UAV to the specific location. For example, the UAV 500 may stream a video feed or a sequence of still images from the UAV's imaging system(s) 508. Other examples are possible.

In some embodiments, once a UAV 500 arrives at the general area of a device that requested service, the UAV may utilize a beacon from the device to locate the device. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit an auditory frequency, either in the human range or outside the human range, and the UAV can listen for that frequency and navigate accordingly.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV, so that the UAV can move in the determined manner.

C. Communication Systems

In a further aspect, UAV 500 includes one or more communication systems 520. The communication systems 520 may include one or more wireless interfaces and/or one or more wireline interfaces, which allow UAV 500 to communicate via one or more networks. Such wireless interfaces may provide for communication under one or more wireless communication protocols, such as Bluetooth, Wifi (e.g., an IEEE 802.11 protocol), Long-Term Evolution (LTE), WiMAX (e.g., an IEEE 802.16 standard), a radio-frequency ID (RFID) protocol, a microwave communication protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 500 may include communication systems 520 that allow for both short-range communication and long-range communication. For example, the UAV 500 may be configured for short-range communications using Wifi and for long-range communication under an LTE protocol. In such an embodiment, the UAV 500 may be configured to function as a "hot spot" or in other words, as a gateway or proxy between one or more devices served by the UAV and one or more data networks, such as cellular networks and/or the Internet. Configured as such, the UAV 500 may facilitate data communications that the device(s) would otherwise be unable to perform by themselves.

For example, UAV 500 may provide a Wifi connection to a client device, and serve as a proxy or gateway to a cellular service provider's data network, which the UAV might connect to under an LTE or a 3G protocol, for instance. The UAV 500 could also serve as a proxy or gateway to a high-altitude balloon network, a microwave network, a satellite network, or a combination of these networks, among others, which a client device might not be able to otherwise access.

In addition to facilitating communication between UAV 500 and a client device, or between UAV 500 and a data network, communication systems 520 may also facilitate one or more command and control interfaces. The interfaces may be used by central dispatch system 408, for example, to provide flight parameters (e.g., target location, flight speed, altitude, etc.) to UAV 500, as well as to receive status information from UAV 500.

D. Power Systems

In a further aspect, UAV 500 may include power system(s) 521. A power system 521 may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery. Other techniques for powering a UAV, such as solar power or gasoline engines, may be used as well.

E. Payloads

UAV 500 may employ various systems and configurations in order to transport items. In the illustrated embodiment, a payload 522 may serve as a compartment that can hold one or more items, such that a UAV 500 can deliver the one or more items to a target delivery location. For example, as shown in FIG. 1, a UAV 100 can include an enclosure 130, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items. Other examples are also possible. For instance, payload 522 may include supplemental batteries and/or auxiliary communication equipment.

F. Service Modules

As noted above, UAV 500 may include one or more service modules 516. The one or more service modules 516 include software, firmware, and/or hardware that may help to provide or assist in the provision of the UAV-related services.

Configured as such, a UAV 500 may provide various types of service. For instance, a UAV 500 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions and/or that provides a text-based interface via which the person can ask such questions, and then determines and provides answers to such questions.

In some embodiments, a UAV 500 may facilitate communication between a person at the location and personnel at a remote location. As an example, a service module 516 may provide a user interface via which a person at the scene can use a communication system 520 of the UAV to communicate with a technician at a remote location. As another example, the UAV 500 can unlock certain capabilities of a remote device, such as a mobile phone, which is near the UAV at the scene of a medical situation. Other examples are also possible.

4. Example UAV Nests

Figure 6:
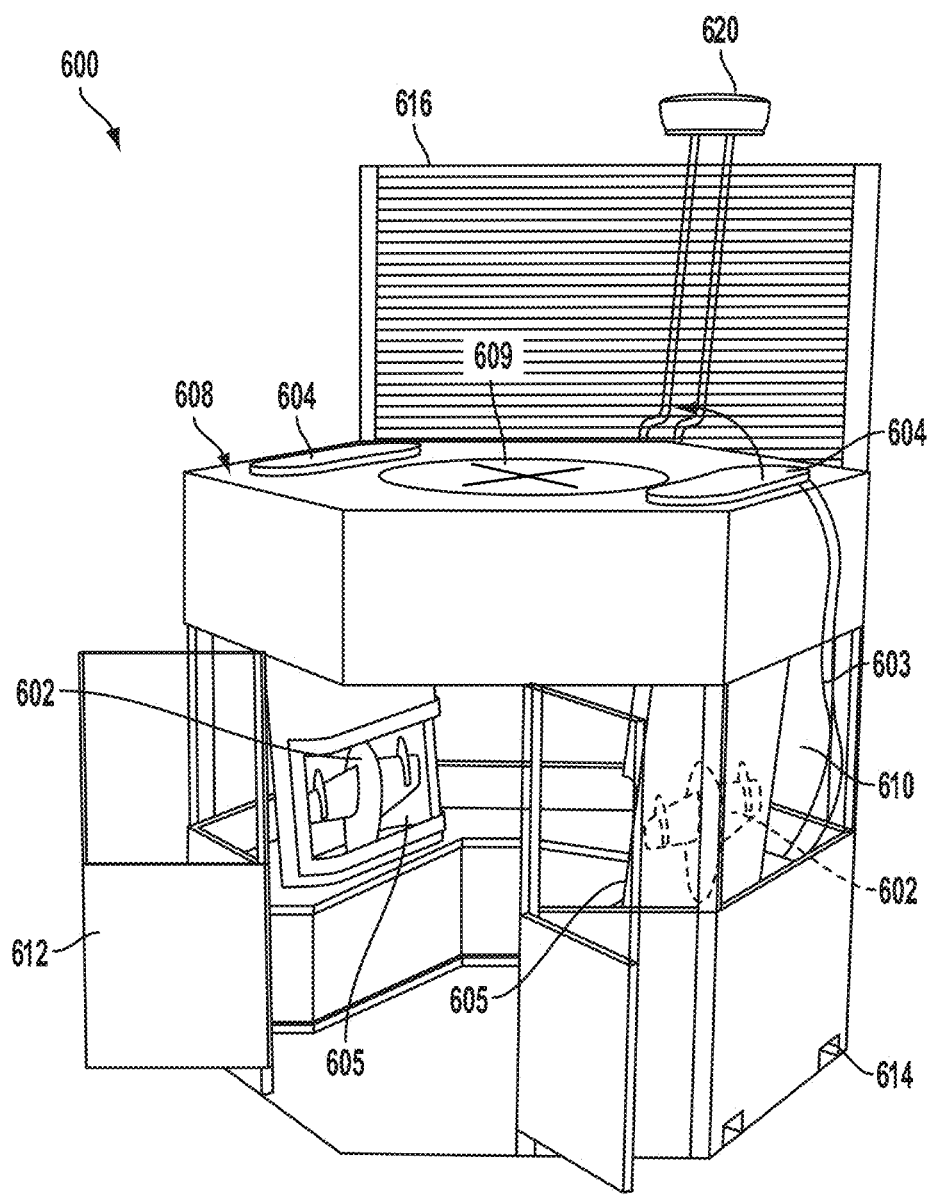
FIG. 6 is a simplified block diagram illustrating components of a UAV nest, according to example embodiments.

In some embodiments, a nest for a UAV may be a home station that includes a landing feature, automated battery recharging and/or swapping systems, maintenance systems, and/or a launch system that operates without physical intervention from an operator (or perhaps with less physical intervention than might otherwise be required). FIG. 6 is an illustration of a nest, according to an example embodiment. An example nest 600 may be built on a frame structure, which in the illustrated example is a hexagonal frame, which supports a landing pad 609 and includes one or more launch systems. Nest 600 is generally arranged on a frame structure, which supports a roof on which the landing pad 609 is disposed, and includes side sections that provide a human-sized chamber beneath the roof. The chamber is partially closed and provides access to two launch systems that are substantially housed within the chamber, such that a human operator can operate the launch systems from within the chamber. Some embodiments of nest 600 might be partially or fully automated such that a human operator is not required.

Herein, a "human-sized" chamber or room should be understood to be any wholly or partially enclosed volume that is large enough to be occupied by a human, while the human is utilizing input interfaces in the chamber (e.g., control interfaces for a nest and/or a UAV). For instance, the interior of nest 600 may provide enough room under roof 608 for some or most humans to stand up fully (e.g., five feet or more or of clearance), while accessing a UAV 602. As such, the interior of nest 600 may be considered to be a "human-sized" chamber. In other cases, a human-sized chamber may not provide enough room for the average human to stand up fully. For example, a chamber with a seat, which is sized to accommodate a human sitting in the seat, may be considered to be a human-sized chamber, regardless of whether or not the chamber is large enough for the human to stand up fully.

An example launch system includes a launch tube 603 and a panel 605 that can be opened or closed to access or restrict access to the interior of the launch tube. An operator may thus open panel 605 and place a UAV 602 on a launch mechanism that is operable to propel the UAV 602 upwards through the launch tube 603 and out of an opening in the roof that is provided when the launch-tube hatch 604 is opened. Note that in some implementations, a UAV, such as a tail-sitter UAV, may also be configured to launch directly from the roof 608 of the nest (e.g., from the landing pad 609).

In a further aspect, the panel may help to improve the safety for a human operator of nest 600. For example, the launch system may require that the moveable panel 605 be closed in order for a launch process to be initiated.

A landing pad 609 may be arranged on the roof of the nest, such that the landing pad is accessible for a UAV to land thereon. The landing pad may include a launch hatch 604 at the top end of each launch tube 603. A launch hatch 604 may be configured to open as part of a launch process (and possibly only if the interior access panel to the launch tube is closed), and to otherwise remain closed, thereby sealing the opening at the top of launch tube 603 when no UAV is being launched.

In some embodiments, the landing pad may include a zero-impact or low-impact grass surface on which the UAV can land. Further, the landing pad 609 may include at least one visual feature to assist a UAV in landing on the landing pad, such as a distinctively colored "X" on its surface or a beacon that the onboard camera in a UAV can use to accurately locate and land on the landing pad (e.g., using visual odometry).

In another aspect, ultrasonic or IR transmitters (not shown) on or near landing pad 609 could be used to help improve a UAV's landing accuracy. In such embodiments, the UAV 602 may include ultrasonic or IR receivers that can receive signals from the nest's transmitters, and use the received signals to help locate the landing pad 609.

In a further aspect, a recovery net 616 may be adjacent to the landing pad. The recovery net 616 may be arranged such that when the UAV is in the process of landing, the recovery net receives the UAV and/or guides the UAV towards the landing pad. The recovery net 616 may also improve safety, e.g., by protecting those that might be in the vicinity of the nest.

In some embodiments, a horizontal net could be placed around a landing pad as a safety measure. For example, a "donut-shaped" net could be placed around the circumference of landing pad 609, which may protect the UAV and/or prevent the UAV from falling off the roof of nest 600, in the event the UAV misses the landing pad 609 by a small amount. Other examples of such nets surrounding a landing pad are also possible.

In some embodiments, the nest's landing feature may include or take the form of a horizontally-arranged recovery net (not shown), which may be used instead of a landing pad 609. In such an embodiment, a horizontal recovery net may be raised, such that there is an air gap underneath the horizontal recovery net (e.g., a gap between the recovery net and the roof of the nest), such that the recovery net can stretch in order to support, and possibly to "catch" a UAV. Such a horizontal recovery net may include similar visual features to assist in landing as described in reference to landing pad 609.

To illustrate, consider a scenario where a UAV is landing on a nest that is equipped with a horizontal recovery net on its roof. When returning from a flight, the UAV could switch to a hover mode, lower itself close to the net, and then power off or reduce power to its motors so that it falls into the horizontal recovery net. This type of horizontal recovery net may therefore be particularly useful if a UAV does not have landing gear (e.g., feet or wheels). Of course, a horizontal recovery net may be useful for other landing techniques and/or for other types of UAVs (e.g., UAVs that have landing gear).

In a further aspect, nest 600 may include one or more mechanical battery-replacement systems, which may each be configured to: (a) remove a first battery from the UAV, (b) connect the first battery to a charging system, and (c) after removal of the first battery, install a second battery in the UAV.

In some embodiments, nest 600 may include one or more battery swapping systems instead of, or in addition to, battery charging and/or replacement systems. In such embodiments, UAV 602 may include two or more power sources, such that the UAV can be continuously powered during the process of exchanging a used battery for a new battery. As such, a battery swapping system (or battery exchange system) may include one or more mechanical features that can automate the process of removing a battery from the robot, such as robotic arms, pinchers, and/or magnetic features (e.g., controllable electromagnets for attaching to and removing a battery), among other possibilities. In some embodiments, such a system may be operable to place a new battery in UAV 602, before an old battery is removed. This may allow UAV 602 to operate (e.g., fly) with only one battery, which may reduce weight and extend flight time.

Nest 600 may include an onboard integrated computer (not shown), which may generally control the operation of the nest (e.g., those functions that are not controlled by a human operator). The integrated computer may also be referred to as the nest's "control system." Further, the control system may include software and/or firmware to control the UAV 602 and/or to facilitate control of the UAV 602 by a human operator. Yet further, control system may generate and/or store log data, diagnostic data, and/or flight data for UAVs 602. Such data may be stored locally in data storage in the nest 600, and/or may be stored in the cloud (e.g., if an internet connection is available). The control system may also be configured to check for software updates and/or to allow for remote updates of its software.

In some embodiments, nest 600 may also include a diagnostics system (not shown) for UAV 602. Various types of diagnostic systems are possible. The diagnostics system may include: (a) an onboard integrated computer and (b) one or more interfaces for acquiring data from a UAV. Configured as such, the diagnostics system may perform basic diagnostics on the UAV, such as testing motor controllers, propellers, and/or on-board sensors to ascertain whether these components are functioning properly and/or have been damaged.

In a further aspect, nest 600 may include one or more systems for communicating with a UAV that has been launched from the nest and is flying to or located at a target location. For example, nest 600 may include a long-range (e.g., up to 70 kilometers) communication system configured for communications with the UAV. Such a long-range communication system may include a long-range directional antenna for RF communications with UAV 602, as well as a directional tracking mechanism to facilitate the aiming of the directional antenna at UAV 602 while UAV 602 is in flight.

A nest 600 may also include other types of communication systems, which may allow for communications via the Internet and/or other data networks. For example, a router, modem and interface to a local wireless network may enable nest 600 to connect to the Internet. As such, local UAV operators at the nest can run diagnostics. Further, such network connectivity may allow for remote control of some or all operations of a nest 600 and/or a UAV 602. Further, in some embodiments, nest 600 may include an integrated ground-station radar system 620 that provides air traffic control information to the nest's onboard computer. Alternatively, nest 600 may connect to a remote radar system to obtain such air traffic control information.

5. UAV Deployment for Augmenting Wireless Network Capacity

FIG. 7A depicts wireless network coverage in accordance with an example embodiment. Particularly, three base stations (BS 700, BS 702, and BS 704) may provide cellular coverage areas, Wifi coverage areas, or some other type of wireless coverage areas. The coverage footprints of these wireless coverage areas are shown as circles in FIG. 7A, with each wireless coverage area consisting of three sectors of approximately 120 degrees. In full generality, however, wireless coverage areas may have non-circular coverage footprints, and may include more or fewer sectors.

Client device 706, marked with a large X, is a device, group of devices, a structure, or some other entity, that is seeking augmented wireless coverage. As shown in FIG. 7A, client device 706 is on the edge of the wireless coverage areas defined by BS 700 and BS 704, and is not within the wireless coverage area defined by BS 702. As a result, client device 706 may experience limited network capacity when served by BS 700 and/or BS 704. For instance, client device 706 might only receive 500 kilobits per second of upstream and/or downstream capacity in its shown location, rather than the several megabits per second that it might receive if it were close to BS 700 and/or BS 704. As a consequence, client device 706 might not be able to participate in certain activities that require significant amounts of network capacity, such as streaming video or downloading large files, or may find these activities to be unacceptably slow.

Possibly based on the need for more capacity to serve client device 706, UAV 708 may be deployed to the vicinity of client device 706. UAV 708 may include the components described in the context of FIG. 5. With respect to its communication systems, UAV 708 may be equipped with a first wireless transceiver for communicating with client device 706 (e.g., devices at that location), and a second wireless transceiver for communicating with a base station that is coupled to the Internet or another data network.

Figure 7B:
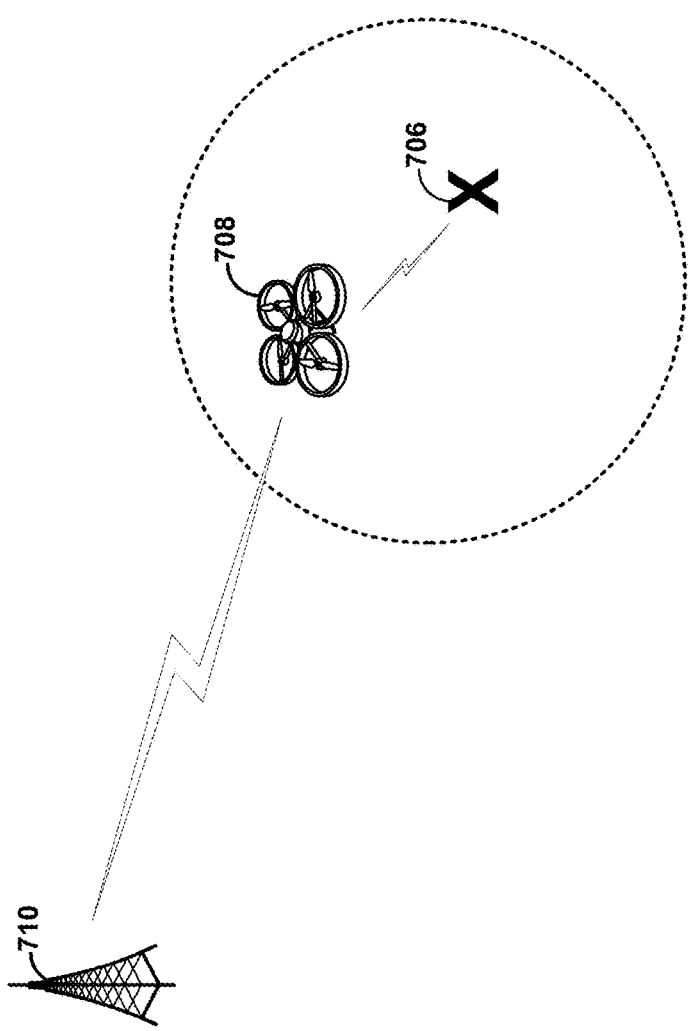
FIG. 7B depicts a UAV defining one or more wireless coverage areas, according to example embodiments.

As an example, FIG. 7B depicts UAV 708 defining a wireless coverage area (e.g., a cellular or Wifi coverage area) with its first wireless transceiver, and communicating with BS 710 via cellular, Wifi, microwave, or another wireless technology. Thus, client device 706 may be able to achieve data transfer via UAV 708 at a higher capacity than any data transfer that might be available via BS 700 and/or BS 704. BS 710 may be a base station that is separate from and/or not associated with BS 700, BS 702, or BS 704. The same or different range of frequencies may be used by the first and second wireless transceivers.

Particularly, UAV 708 may hover over or nearby, or fly over or nearby, client device 706, and relay communications between client device 706 and BS 710. If client device 706 is moving, UAV 708 may adjust its position to track these movements. Thus, UAV 708 may move along with client device 706, following at a particular altitude, for instance. As an example, UAV may move along a route with a bus or train, providing wireless coverage to devices on the bus or train.

In this manner, network capacity may be deployed, on demand or upon need, to client device 706. Further, UAV 708 may select its altitude to provide an appropriate tradeoff of coverage footprint versus data rate. The lower UAV 708 flies (e.g., the closer UAV 708 is to client device 706), the greater the achievable data rate between client device 706 and UAV 708, but the smaller the diameter of the coverage footprint. On the other hand, the higher UAV 708 flies, the larger the diameter of the coverage footprint, but the lower the achievable data rate between client device 706 and UAV 708. Thus, if client device 706 consists of multiple devices spread out over a location, UAV 708 may select an appropriately high altitude in order to provide reasonable data rates to all of these devices. However, if client device 706 consists of one or more devices in close proximity to one another, UAV 708 may select a lower altitude so that it can provide higher data rates to the devices. Other factors such as remaining UAV flight time (e.g., based on remaining battery life) and/or wireless transmit power may also be taken into account when selecting a UAV's altitude.

Figure 7C:
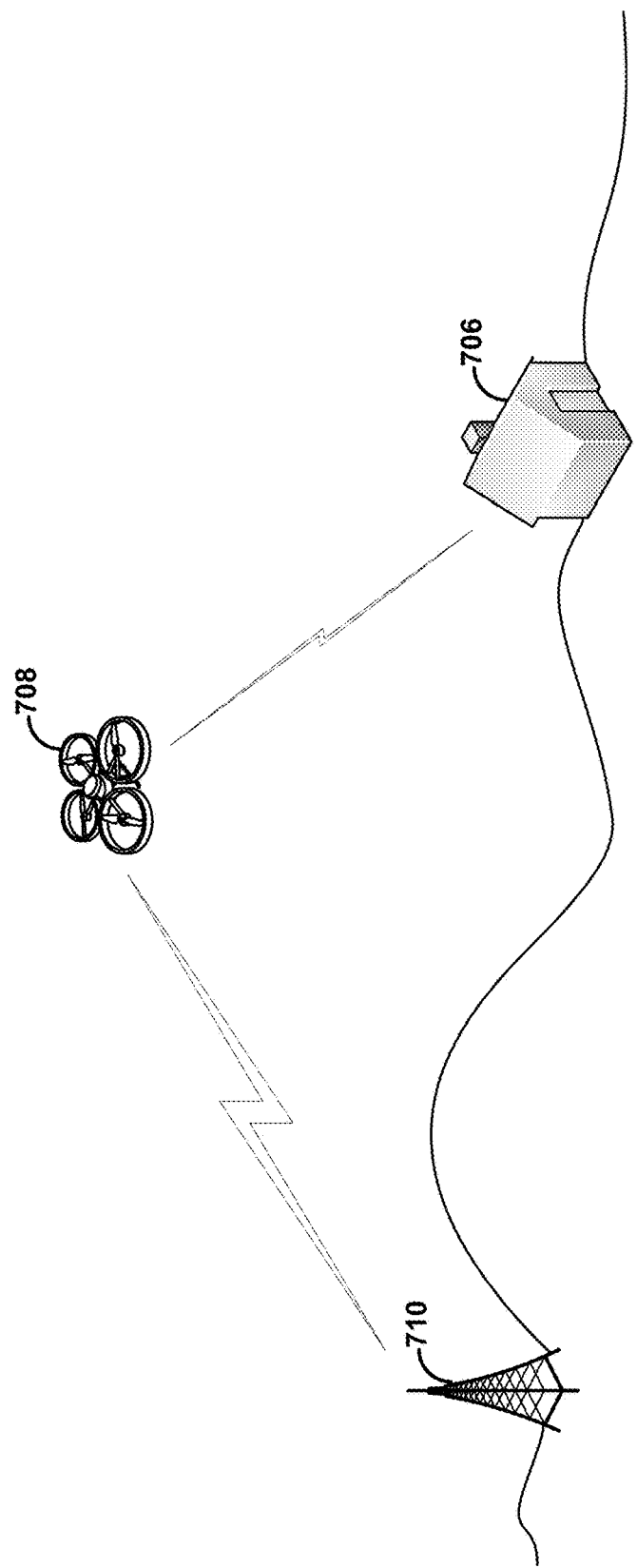
FIG. 7C depicts a UAV providing wireless services to a client device or location with wireless backhaul to a terrestrial base station, according to example embodiments.

As noted above, UAV 708 may communicate with BS 710. One advantage of doing so is illustrated by FIG. 7C. This figure depicts client device 706 as a house (potentially with many devices that seek data transfer) which is separated from BS 710 by a hilly or mountainous region that may interfere with wireless communication between client device 706 and BS 710. Using UAV 708 as a dynamically positioned backhaul relay between client device 706 and BS 710 may improve this communication. Particularly, UAV 708 may be positioned so that it has non-occluded transmission paths to both client device 706 and BS 710. For instance, UAV 708 may define a cellular wireless coverage area to serve client device 706, and may be in line-of-sight (e.g., microwave, laser-based, free-space optical) communication with BS 710. In this way, physical topology inhibiting land-based wireless communication might not be an impediment to the UAV-based wireless communication discussed herein.

Figure 7D:
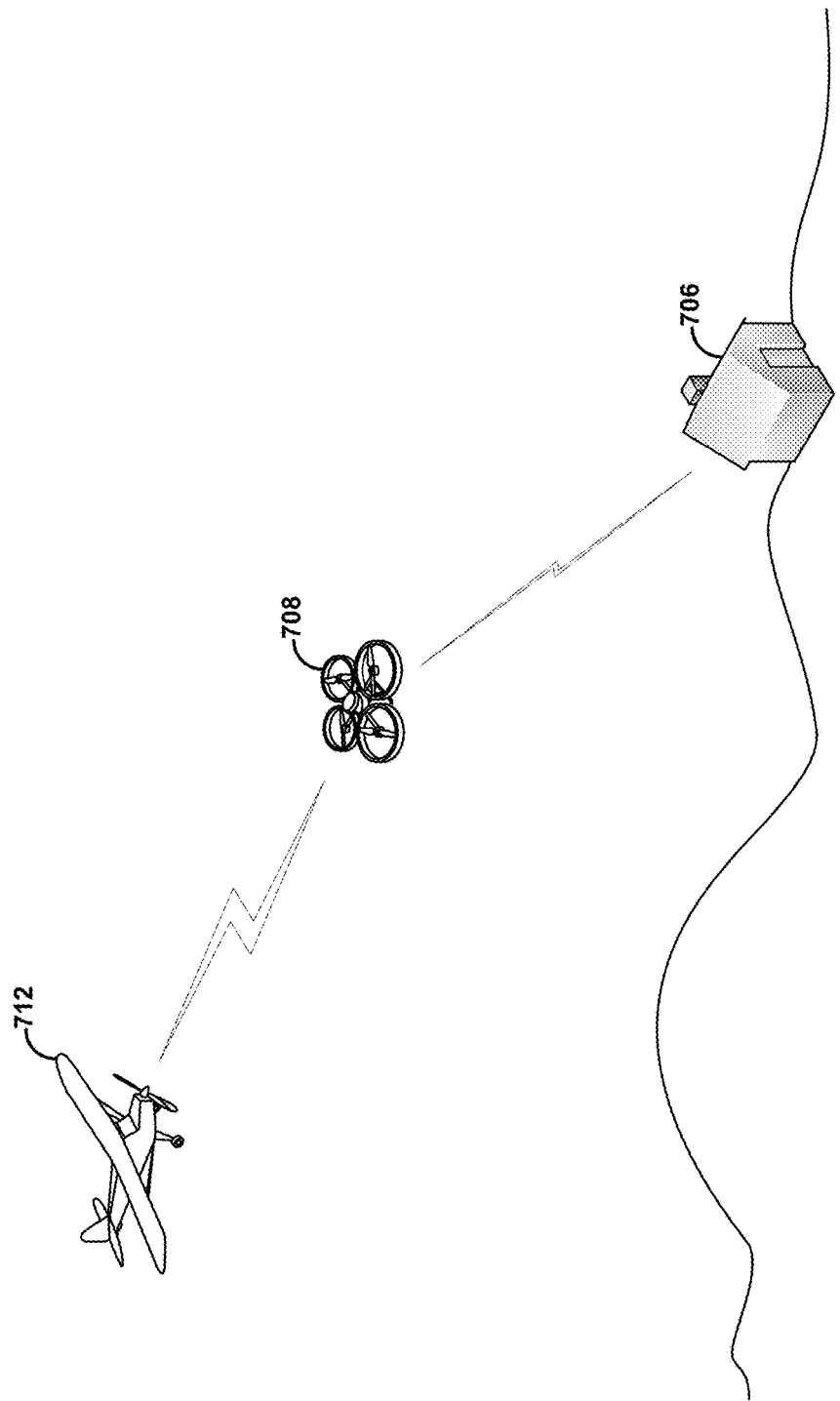
FIG. 7D depicts a UAV providing wireless services to a client device or location with wireless backhaul to another aerial vehicle, according to example embodiments.

FIG. 7D depicts an alternative embodiment in which BS 710 is replaced by plane 712. Plane 712 may be a UAV or a manned vehicle that provides connectivity between client device 706 and the Internet or another data network. Thus, like UAV 708, plane 712 may include two wireless transmitters, one for communication with UAV 708 and another for communication with a terrestrial base station (not shown).

UAV 708 and plane 712 may be part of a large hierarchy of UAVs and/or manned vehicles that provide on-demand data transmission augmentation. For instance, plane 712 may serve as a backhaul relay for multiple UAVs. In some embodiments, plane 712 may be a backhaul relay between (i) one or more of these UAVs, and (ii) another UAV or manned vehicle (not shown). This latter UAV may be, for example, another plane, a balloon, or another type of vehicle that provides communication with a terrestrial base station or yet another UAV.

In this manner, there may be multiple "levels" of UAVs, where these levels roughly correspond to the operating altitudes of the UAVs. Thus, the lowest level of UAVs may provide wireless coverage for terrestrial devices, the second-lowest level of UAVs may provide wireless coverage for the lowest level of UAVs, and so on. In general, level i of UAVs may provide wireless coverage for level i−1 of UAVs, while being served by level i+1 of UAVs. In these scenarios, i may take on values from 1 to n−1, where n is the number of UAV levels in the hierarchy. Further, the altitude of UAVs at each level of the hierarchy increases with level numbering. Thus, UAVs at level 1 are closest to the ground in altitude, while UAVs at level n are furthest from the ground in altitude.

Figure 7E:
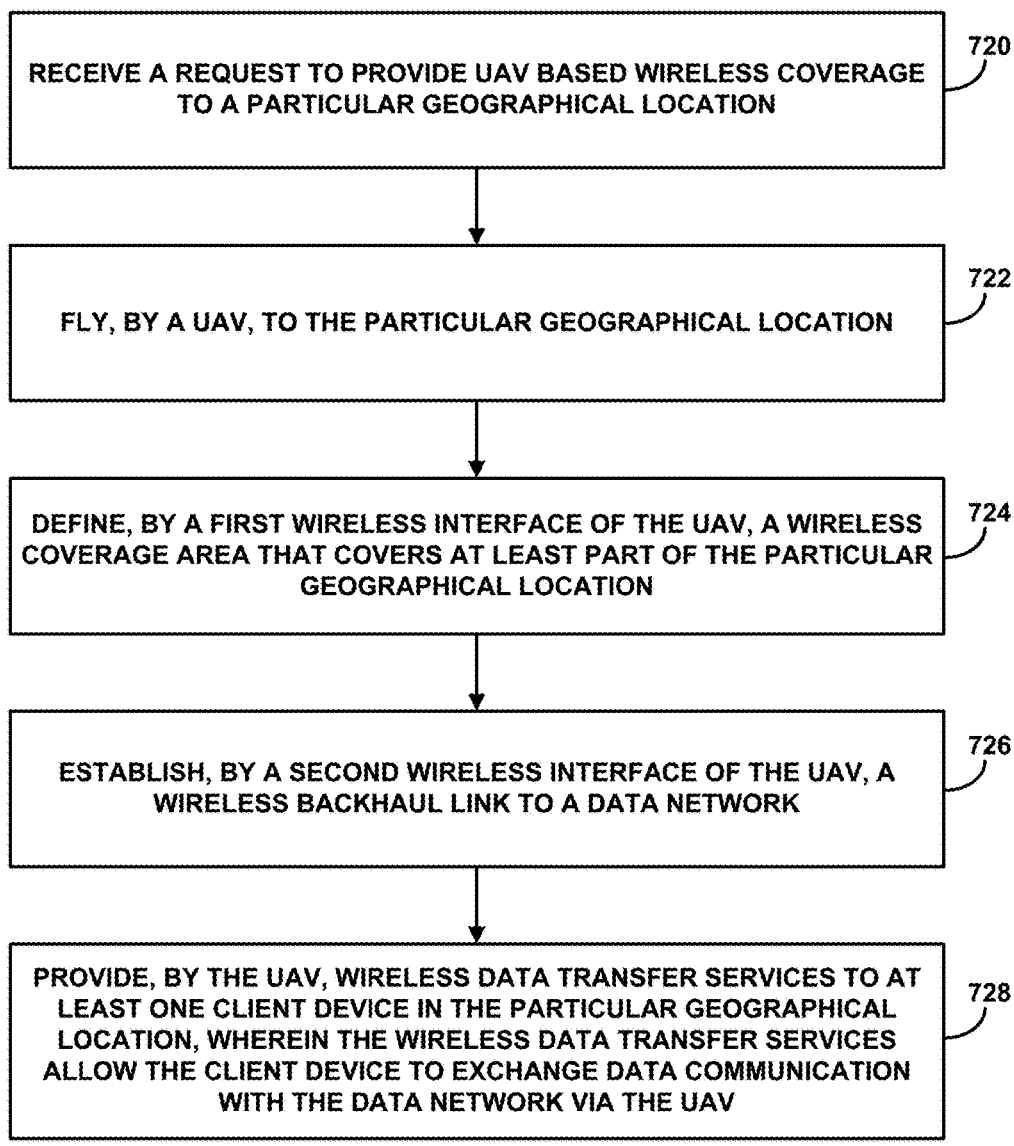
FIG. 7E is a flow chart, according to example embodiments.

FIG. 7E is a flow chart in accordance with example embodiments. The operations in this flow chart may be performed by components of UAV—particularly, by a computing unit (e.g., a processor with memory and other peripheral components) and communication unit of such a UAV Block 720 may involve receiving a request to provide UAV based wireless coverage to a particular geographical location. This request may take various forms, such as but not limited to a phone call, a text message, a web-based request, a request carried out over various types of wireless technologies (e.g., 2G, 3G, 4G, 5G), and so on. The request may occur whenever there is a desire for more capacity or a faster data rate than is currently available at the location of the requestor. Block 722 may involve, possibly in response to the request, flying, by a UAV, to the particular geographical location.

Block 724 may involve defining, by a first wireless interface of the UAV, a wireless coverage area that covers at least part of the particular geographical location. The first wireless interface may be either a Wifi interface or a cellular interface.

Block 726 may involve establishing, by a second wireless interface of the UAV, a wireless backhaul link to a data network. The second wireless interface may be a Wifi interface, a line-of-sight interface, a cellular interface, or some other type of interface. The wireless backhaul link may be between the UAV and a terrestrial base station. Alternatively, the UAV may be a first UAV, and the wireless backhaul link may be between the first UAV and a second UAV Block 728 may involve providing, by the UAV, wireless data transfer services to at least one client device in the particular geographical location, wherein the wireless data transfer services allow the client device to exchange data communication with the data network via the UAV. Some embodiments may further involve, after providing the wireless data transfer services, flying, by the UAV, to a different geographical location.

In some embodiments, prior to providing wireless data transfer services to the at least one client device in the particular geographical location, the at least one client device may have been in communication with a particular server device. Providing wireless data transfer services to the at least one client device in the particular geographical location may involve exchanging the data communication to and from the particular server device via the UAV. In some instances, this may involve the client device being seamlessly handed over from other wireless infrastructure to the UAV for continued wireless service.

Figure 7F:
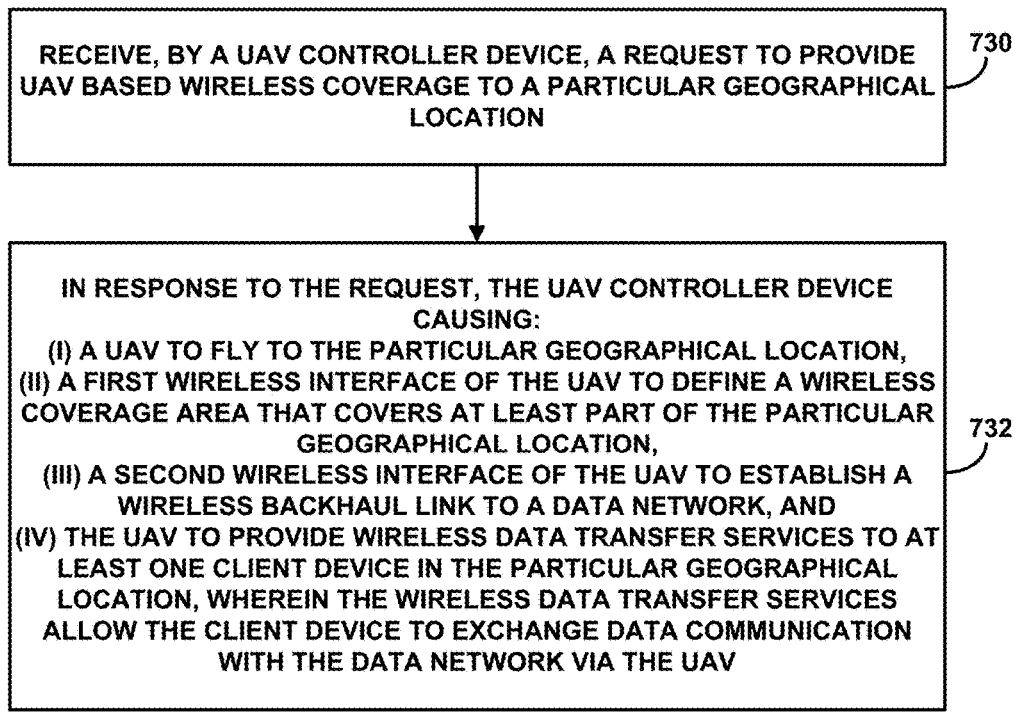
FIG. 7F is a flow chart, according to example embodiments.

FIG. 7F is a flow chart in accordance with example embodiments. The operations in this flow chart may be performed by a computing device associated with a UAV, such as a UAV controller device (e.g., access system 402 and/or central dispatch system 408) that controls the movement and operation of one or more UAVs.

Block 730 may involve receiving, by a UAV controller device, a request to provide UAV based wireless coverage to a particular geographical location. Block 732 may involve, possibly in response to the request, the UAV controller device causing: (i) a UAV to fly to the particular geographical location, (ii) a first wireless interface of the UAV to define a wireless coverage area that covers at least part of the particular geographical location, (iii) a second wireless interface of the UAV to establish a wireless backhaul link to a data network, and (iv) the UAV to provide wireless data transfer services to at least one client device in the particular geographical location, wherein the wireless data transfer services allow the client device to exchange data communication with the data network via the UAV. Additionally, any of the features or variations described in the context of FIG. 7E can be applied to the operations of FIG. 7F.

A. Causing UAV Deployment

As mentioned in the context of FIGS. 7E and 7F, one or more UAVs may be deployed to a target location based on various triggers. These triggers may include, but are not limited to, (i) an explicit request from a client device or user at or associated with the vicinity of the target location, (ii) an implicit request from a client device or user at or associated with the vicinity of the target location, and/or (iii) a request from a wireless service provider for augmented wireless coverage in the vicinity of the target location.

Additionally, a UAV may be scheduled to serve several requests before returning to a nest or otherwise becoming available to serve more requests. For instance, three requests for augmented wireless coverage may be received for three different target locations. A single UAV may be instructed to serially serve these requests, for instance, in a first-come-first-serve fashion. Doing so may be beneficial when there is a significant distance between the UAV's current location (e.g., a nest) and the target locations, but the target location are relatively close to one another.

An explicit request from a client device or user may occur as follows. The client device or user determines a need for augmented wireless coverage. For example, the user of the client device (e.g., a smartphone, tablet, PC, television, set top box, etc.) may become unsatisfied with the client device's current level of wireless coverage.

Through the client device itself, or via another client device, the user may request augmented wireless coverage. For instance, the user may navigate to a web site associated with UAV wireless services, and explicitly request wireless coverage. The web site may be that of access system 402 and/or central dispatch system 408, and the user may have an account in user-account database 414. Alternatively, the user may be prompted to create an account with access system 402 and/or central dispatch system 408, and the user's account data may be stored in user-account database 414.

Possibly via such as web site, the user may merely specify "more wireless coverage" or may specify that a particular data rate (e.g., 1 megabit per second, 5 megabits per second, 10 megabits per second, etc.) is desired. The client device's location may become known to access system 402 and/or central dispatch system 408, either as part of the user's data in user-account database 414 or by gathering this information (e.g., via GPS, cellular triangulation, etc.) from the client device. In some cases, the user's location and the client device's location may be different—for example, the user may request wireless coverage on behalf of a remote client device, or may schedule the wireless coverage to be available at some point in the future, but at a different location from the user's current location. Thus, in some situations, a time, as well as a location, for the wireless coverage may be provided.

Regardless, once the location is known to central dispatch system 408, one or more UAVs may be deployed to the location. Once at the location, or in the vicinity thereof, the UAV(s) may provide wireless coverage to the client device (and possibly other client devices as well). In some situations, the UAV(s) may hover over the location or nearby the location. In other embodiments, the UAV(s) may land on the ground or another object (such as a building) to provide the wireless coverage. The latter scenario may save energy, thereby increasing the UAV's active duty cycle. It is possible for a UAV to switch between airborne and ground positions while providing wireless coverage. Further, it is also possible for a UAV to track the location of one or more client devices and move along with these client devices, providing them with continuing wireless coverage as the client devices move about.

An implicit request from a client device or user may occur as follows. The user, perhaps via the client device or another client device, may request a particular service that requires a nominal data rate. For example, the user may request download or streaming of a movie. For purposes of illustration, the size of a DVD-quality movie may be 3-4.5 gigabytes, the size of a high-definition movie may be 8-15 gigabytes, the size of a blu-ray movie may be 20-25 gigabytes, and the size of a 4K movie may be over 100 gigabytes. Based on the requested movie quality, and perhaps other factors as well, the client device may further request augmented wireless coverage commensurate with the amount of data to be transferred. Alternatively, another device, such as a device that monitors utilization of the wireless coverage nearby the client device, may request the augmented wireless coverage.

This further request may, in turn, determine how many UAVs are deployed to the location, what type of UAVs (e.g., wireless interface type, data storage capacity, etc.), and the height at which the UAV will hover or land in order to provide the wireless coverage. Particularly, before deployment, a selected UAV may be provisioned with the requested content (e.g., the movie). For instance, the UAV may contain a hard drive or solid state drive, and the deployment process may include loading this storage device with a copy of the content. Thus, selecting a UAV may involve selecting one that contains enough storage to contain the requested content.

Once it is providing wireless coverage, the UAV may download or stream the requested content to one or more client devices. In the case of movie downloads, this UAV-based mechanism may be more efficient than other forms of video on demand, because the UAV is able to provide focused high-speed connectivity to deliver the movie to client devices in a much shorter period of time (e.g., minutes) than the running time of the movie itself (e.g., 1-3 hours). Further, this mechanism may avoid congesting other legs of the network, and may also avoid requiring a wireless interface on the UAV for backhaul connectivity to a data network. Nonetheless, in some situations, the UAV may serve as a backhaul relay, and the requested content may be downloaded or streamed via a remote server (e.g., over the Internet).

A UAV that provides augmented wireless coverage for movie downloads may be scheduled to carry out several such downloads at a time or serially. For instance, a number of requests for movie downloads may arrive at central dispatch system 408. While at a nest, a selected UAV may be loaded with each of the requested movies. The UAV may then be deployed to the target locations and engage in the downloads serially before returning to the nest.

A request from a wireless service provider may occur as follows. A cellular wireless service provider may own and/or operate a number of base stations, each defining one or more wireless coverage areas. The wireless service provider may monitor the utilization of each of these wireless coverage areas. Once the utilization of one or more wireless coverage areas in a particular location exceeds a threshold (e.g., 50%, 70%, 90%, etc.), the wireless service provider may transmit a request for augmented wireless coverage to central dispatch system 408.

This request may indicate the location for the augmented wireless coverage, and possibly a time for deployment of the augmented wireless coverage. For instance, the wireless service provider may anticipate a need for augmented wireless coverage based on upcoming events, such as a sporting event, trade show, or concert at a particular venue. Thus, the wireless service provider may schedule this coverage at the time and place of the event.

Once at the location, one or more UAVs may transmit using frequencies and wireless protocols that allow these UAVs to become part of the wireless service provider's network. Other communication parameters including paging parameters, signaling parameters, power level parameters, and/or carrier aggregation parameters may also be specified.

As an example, suppose that the wireless service provider's wireless coverage at the location is using LTE in a particular frequency range. The UAVs may define new wireless coverage areas at the location, using LTE in the particular frequency range. These new wireless coverage areas may use identifiers that make them distinct from other wireless coverage areas in the region. Further, the UAVs' backhaul links may be to a base station controller, radio network controller, mobility management entity, or some other device operated by the wireless service provider. In this manner, the wireless service provider may coordinate handoffs of client devices between its own wireless coverage areas and those defined by the UAVs.

In order to make the client devices in the coverage area attach to the UAVs, as opposed to the wireless service provider's base stations, the UAVs may hover or land at a particular altitude and/or transmit at a particular power. For instance, a UAV hovering close to a client device (e.g., within a few hundred feet), at a low altitude (e.g., less than 50 feet above the client device), and with a high transmission power (e.g., 40-45 dBm) may cause the client device to hand over from a base station of the wireless service provider to the UAV. Conversely, when the UAV leaves the location, hovers at a higher altitude, and/or transmits with a lower power, the client device may hand over back to a base station of the wireless service provider.

In some cases, UAVs may provide temporary coverage to known gaps in cellular network coverage. For instance, until one of these gaps can be covered by terrestrial base stations, one or more UAVs may provide this coverage. In some cases, this may involve one UAV providing coverage until it runs low on battery power or fuel, and then being replaced by another UAV, and so on.

Figure 8:
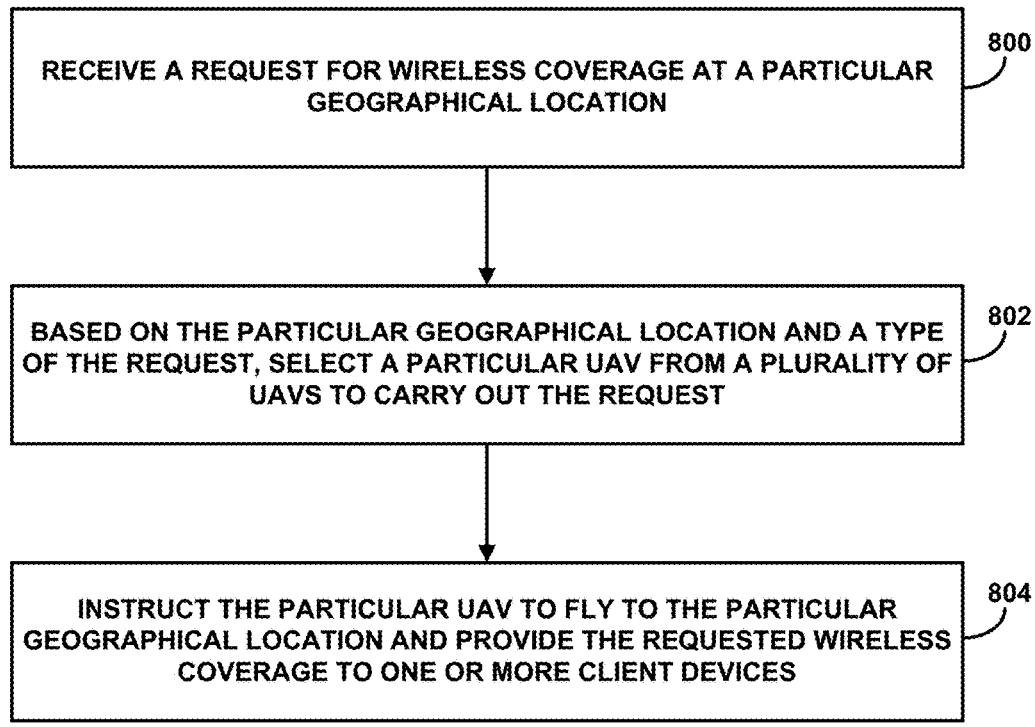
FIG. 8 is a flow chart, according to example embodiments.

FIG. 8 is a flow chart in accordance with example embodiments. The operations in this flow chart may be performed by a computing device associated with a UAV, such as a UAV controller device that controls the movement and operation of one or more UAVs.

Block 800 may involve receiving a request for wireless coverage at a particular geographical location. Block 802 may involve, possibly based on the particular geographical location, selecting a particular UAV from a plurality of UAVs to carry out the request. Block 804 may involve instructing the particular UAV to fly to the particular geographical location and provide the requested wireless coverage to one or more client devices.

In some embodiments, the request for wireless coverage includes a time at which the augmented wireless coverage is to begin. The request for wireless coverage may be received via a web-based portal and may include an indication of the particular geographical location and/or the time. Alternatively, the request for wireless coverage may identify a user account, and receiving the request includes looking up the user account in a user-account database, and identifying a location associated with the user in the user-account database as the particular geographical location.

In some embodiments, the request for wireless coverage originates from a wireless service provider. The request for wireless coverage may include indications of a wireless protocol and a frequency that the particular UAV is to use when providing wireless coverage.

Further, the request for wireless coverage may include an indication of particular media content for downloading or streaming to the one or more client devices at the particular geographical location. Selecting the particular UAV to carry out the request comprises selecting a UAV with data storage capacity for the particular media content. The operations of FIG. 8 may also include loading the particular media content into the data storage of the particular UAV. Providing wireless coverage to one or more client devices may involve downloading or streaming the particular media content to the one or more client devices.

B. UAV Selection

With respect to any UAV selection described herein, UAVs may be selected for deployment based on a number of factors. One or more of these factors may be considered when selecting a UAV for deployment. In some embodiments, each factor may be assigned a value and a weight, and a weighted average of these values may be calculated for each UAV. The resulting per-UAV scores may determine the UAV to be deployed. For instance, the UAV with the highest score may be selected. Regardless, a non-exhaustive list of these factors follows.

Location.

As noted above, when not deployed, UAVs may be stored in a nest, such as nest 600. A metropolitan area may contain anywhere from one to a dozen or more nests. As a consequence, tens or hundreds of UAVs may be available to provide augmented wireless coverage (or other services) to the metropolitan area. When a request for augmented wireless coverage is made (e.g., the request arrives at central dispatch system 408), there may be more than one UAV that could be deployed to carry out the request. It may be beneficial to consider UAV location and the target location of augmented wireless coverage when determining which UAV(s) to deploy. For instance, if two UAVs are candidates for deployment to the target location, the UAV that is closer to the target location may be preferred because that UAV is likely to be able to reach the target location more quickly, and use less power to do so. Additionally, UAVs currently in transit may be considered as well. In some situations, a UAV that is flying back from a deployment may be the closest UAV to the target location, and possibly the best candidate for servicing the target location.

Power.

As noted above, UAVs may use various mechanisms for power, such as batteries or combustion engines, for instance. Based on the expected flight time of the UAV to and from the target location, as well as the expected length of the deployment, some UAVs might not have enough power (e.g., their remaining battery life is too low) to be candidates for deployment. In general, UAVs with full power (e.g., a full battery charge) may be preferable for deployment over UAVs with partial remaining power (e.g., a partial battery charge) or that are in the process of fueling or charging. The expected length of deployment may be explicitly requested by a user (e.g., the user may request augmented wireless coverage for 2 hours) or implicit based on media content identified by the user. For instance, if the user requested download of a 20 gigabyte movie, an expected transfer rate of the movie to the user may be calculated, and the deployment time may be estimated therefrom. In some cases, the term "remaining available mission time" may refer a calculation of how long the UAV has before it should either (i) return to a nest, or (ii) discontinue serving client devices so that it can begin the process of returning to a nest. The remaining available mission time may be based on the UAV's estimated remaining power.

Flight Velocity.

Different UAVs may have different average and maximum flight velocities (e.g., from 30-90 miles per hour). For deployments that are requested in the near future or as soon as possible, faster UAVs may be preferred over slower UAVs. On the other hand, for scheduled deployments that are far enough in the future, slower UAVs may be preferred over faster UAVs.

Wireless Technology Supported by Client Devices in the Target Location/Wireless Interfaces on the UAV.

Client devices in the target location that are to be served by a UAV may support one or more types of wireless technologies. For instance, the client device may support a cellular technology, such as LTE, or a local area network technology, such as Wifi. Based on the technologies supported by the client devices (information of which may be included in a request for augmented wireless coverage or stored in user-account database 414), one or more UAVs with a compatible wireless interface may be selected. For instance, if augmented LTE wireless coverage is requested, a UAV that supports an LTE wireless interface that can define LTE wireless coverage areas may be selected. If applicable, the UAV's wireless interface for backhaul may also be considered. For instance, if the available backhaul links in the vicinity of the target location are limited to microwave links, a UAV with a microwave backhaul interface may be selected.

UAV Data Storage Capacity.

For a request for particular media content that has a particular size, the data storage capacity of UAVs may be considered. For instance, if several 4K movies totaling 700 gigabytes have been requested, a UAV with data storage capacity of over 700 gigabytes may be selected.

Other factors, such as support of optional features of a wireless protocol (e.g., LTE carrier aggregation, 5 GHz Wifi, etc.), estimated backhaul link signal quality (e.g., based on the distance between the target location and a backhaul node, etc.), and the range of altitudes at which a UAV can operate, may also be considered.

One or more of the factors described in this section, as well as other factors not explicitly discussed herein, may be considered as part of block 802 of FIG. 8 to select a UAV. In some cases, the one or more factors may be processed by a cost function, an optimization algorithm, or a machine learning algorithm to select a UAV. Further, certain rules may be used to exclude some UAVs from consideration. For instance, UAVs with less than 50% remaining power or more than 25 miles from the target location might be excluded in this fashion.

C. UAV Wireless Connectivity to Client Device(s)

Once deployed to a target location, a UAV may provide wireless service to one or more client devices in various ways. Three possible embodiments of how a UAV may provide this connectivity are illustrated in FIGS. 9A, 9B, 9C, 9D, 10A, 10B, 11A, 11B, and 11C. Other mechanisms may be used.

Figure 9A:
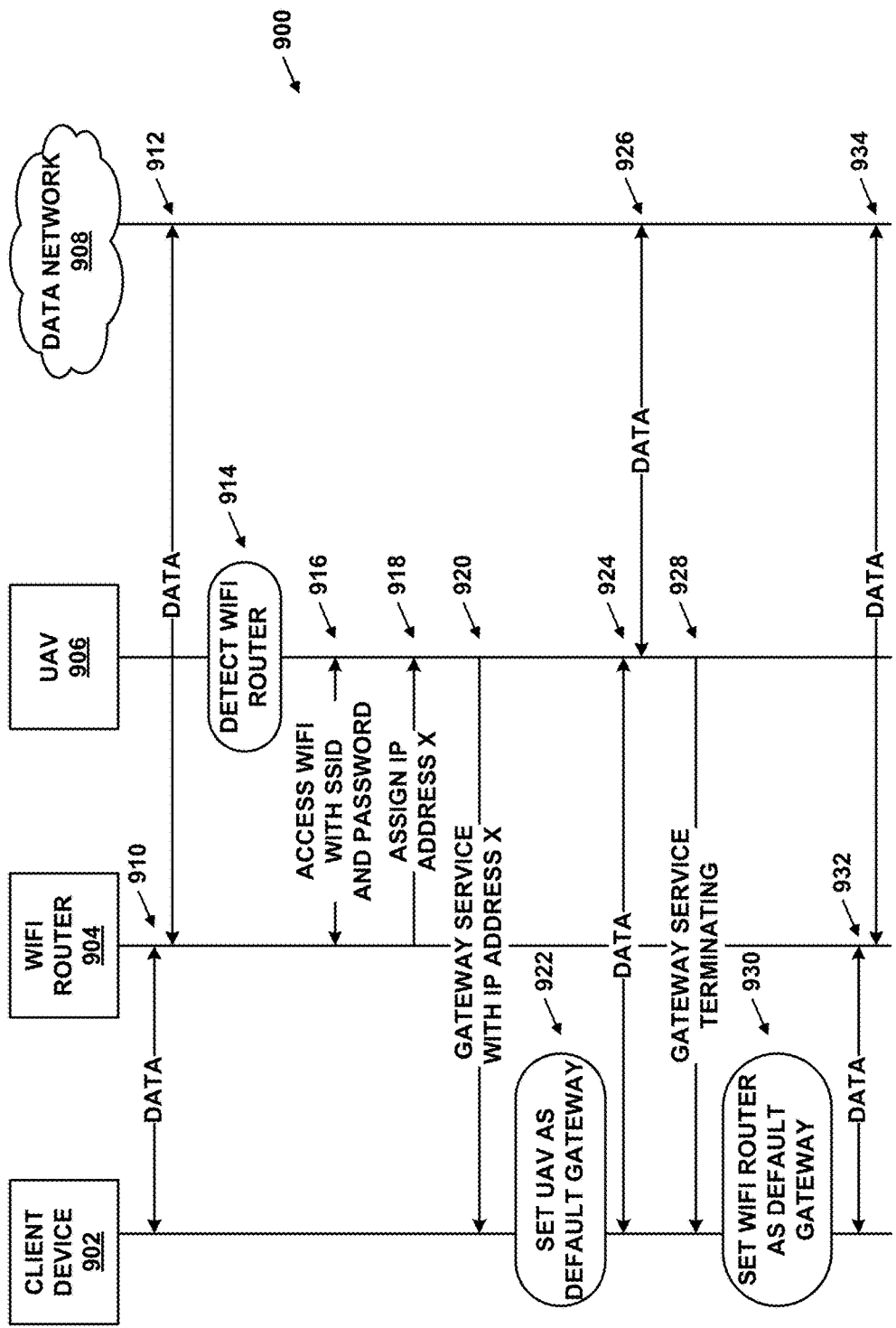
FIG. 9A is a message flow diagram, according to example embodiments.

FIG. 9A is a message flow diagram 900 illustrating a UAV connecting to a preexisting Wifi network at a target location. At steps 910 and 912, client device 902 exchanges data with one or more devices via Wifi router 904 and data network 908. The data exchanged may be any type of transaction—web browsing, gaming, email, messaging, voice over IP, media streaming, file downloads, etc. In some embodiments, the backhaul link between Wifi router 904 and data network 908 may have limited capacity. As a result, client device 902 may request augmented wireless coverage, and UAV 906 may be deployed to provide this coverage.

At step 914, UAV 906 arrives in the vicinity of Wifi router 904 and detects Wifi router 904. UAV 906 may have been deployed from a nest with instructions to fly to GPS coordinates nearby Wifi router 904. In some cases, client device 902 may provide these GPS coordinates in the request for augmented wireless coverage. In order to detect Wifi router 904, UAV 906 may be provided with a service set identifier (SSID) that identifies a Wifi network defined by Wifi router 904. UAV 906 may scan available Wifi frequencies for this SSID. Once UAV 906 detects the Wifi network associated with the SSD, at step 916, UAV 906 may access the Wifi network using the SSID and a password. Like the SSID, the password may have been provided to UAV 906.

At step 918, Wifi router 904 may assign IP address X to UAV 906, with which UAV 906 may communicate with other devices using the Wifi network. Particularly, at step 920, UAV 906 may transmit a notification via the Wifi network that UAV 906 is providing a gateway service at IP address X. Here, the term "gateway" may refer to UAV 906 performing a routing function with which UAV 906 can route data packets between the Wifi network and data network 908. UAV 906 may also establish a wireless backhaul link with another device so that UAV 906 is able to communicate with data network 908 via this link.

At step 922, after receiving the notification, client device 902 may set UAV 906 as its default gateway. Thus, any packets originated by client device 902 that are not transmitted directly to devices on the Wifi network may instead be transmitted to UAV 906 so that UAV 906 can forward these packets toward their ultimate destinations.

At steps 924 and 926, client device 902 exchanges data with one or more devices via UAV 906 and data network 908. In contrast to steps 910 and 912, this data passes through UAV 906, which may be able to provide greater data transfer rates than Wifi router 904. For instance, the wireless backhaul link of UAV 906 may have several times the capacity as the backhaul link of Wifi router 904.

At step 928, after some period of time either defined by the request for augmented wireless coverage or determined otherwise, UAV 906 may transmit a second notification via the Wifi network. The second notification may indicate that the gateway service of UAV 906 is terminating. At step 930, client device 902, perhaps in response to receiving the second notification, may set Wifi router 904 as its default gateway. For instance, client device 902 may (i) replace IP address X of UAV 906 with the IP address of Wifi router 904 that client device 902 previously used as a default gateway, (ii) transmit a dynamic host configuration protocol (DHCP) discover or request message in order to obtain a default gateway address from Wifi router 904, or (iii) reset its network interface, resulting in client device 902 transmitting a DHCP discover or request message in order to obtain a default gateway address from Wifi router 904. Other mechanisms are possible.

Regardless, at steps 932 and 934, client device 902 may once again exchange data with one or more devices via Wifi router 904 and data network 908. UAV 906 may fly away from the vicinity of the Wifi network, perhaps back to a nest or on to another location at which to provide augmented wireless coverage.

Figure 9B:
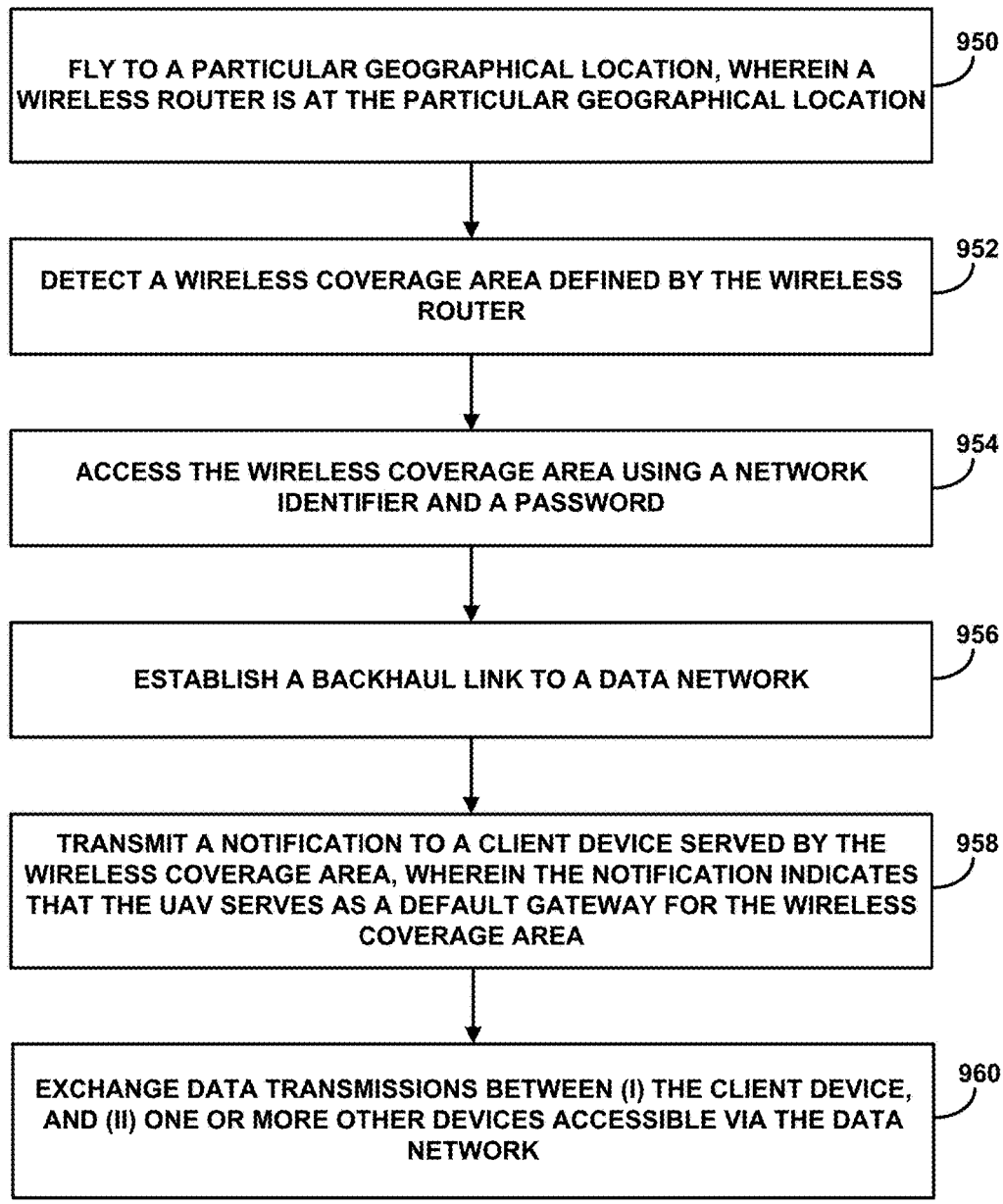
FIG. 9B is a flow chart, according to example embodiments.

FIG. 9B is a flow chart in accordance with example embodiments. The operations in this flow chart may be performed by components of UAV—particularly, by a computing unit (e.g., a processor with memory and other peripheral components) and communication unit of such a UAV.

Block 950 may involve flying to a particular geographical location. A wireless router may be at the particular geographical location. The wireless router may be a Wifi router and the wireless coverage area may be a Wifi local wireless network.

Block 952 may involve detecting a wireless coverage area defined by the wireless router. Block 954 may involve accessing the wireless coverage area using a network identifier and a password. In some embodiments, the UAV may obtain, during this process, the network identifier and the password from a UAV controller device. Alternatively, the network identifier and the password may be preloaded into the UAV prior to the UAV flying to the particular geographical location. The network identifier may be an SSID.

Block 956 may involve establishing a backhaul link to a data network. Block 958 may involve transmitting a notification to a client device served by the wireless coverage area. The notification may indicate that the UAV serves as a default gateway for the wireless coverage area. The notification may be unicast, multicast, or broadcast via the wireless coverage area.

In some embodiments, prior to receiving the notification, the client device is assigned a default gateway address of a first IP address. The UAV may be assigned a second IP address by the wireless router, and the notification may include the second IP address. Reception of the notification by the client device may cause the client device to change its default gateway address to the second IP address.

Block 960 may involve exchanging data transmissions between (i) a client device, and (ii) one or more other devices accessible via the data network.

Further operations may involve determining that the UAV is no longer going to serve as default gateway for the wireless coverage area, and transmitting a second notification to the client device. The second notification may indicate that the UAV is no longer going to serve as default gateway for the wireless coverage area. Reception of the second notification may cause the client device to change its default gateway address to the first IP address. In some scenarios, the client device changing its default gateway address to the first IP address comprises the client device performing a DHCP renewal operation.

Figure 9C:
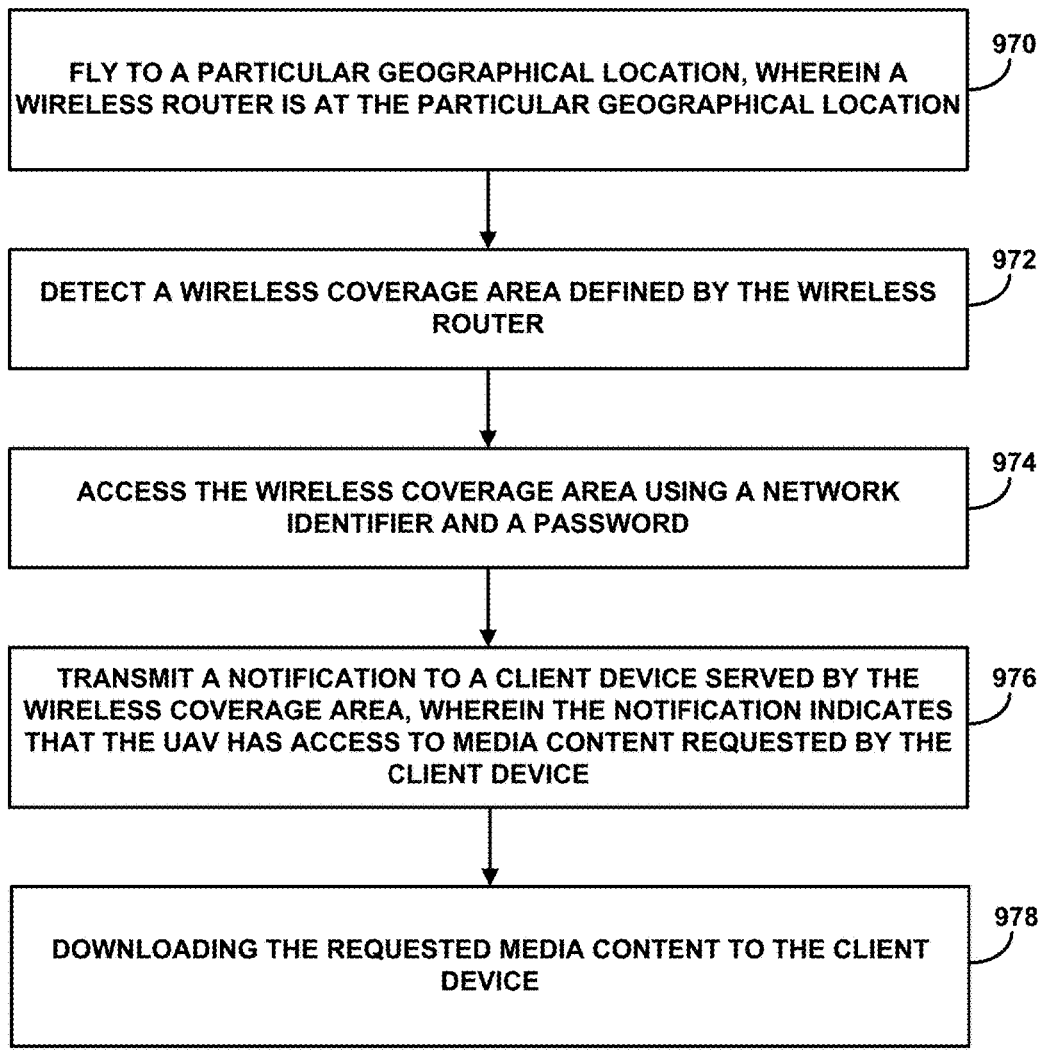
FIG. 9C is a flow chart, according to example embodiments.

FIG. 9C is also a flow chart in accordance with example embodiments. The operations in this flow chart may be performed by components of UAV—particularly, by a computing unit (e.g., a processor with memory and other peripheral components) and communication unit of such a UAV. In the scenario focused on in FIG. 9C, the UAV is preloaded with media content for download to a client device on a wireless local area network.

Block 970 may involve flying to a particular geographical location. A wireless router may be at the particular geographical location. Block 972 may involve detecting a wireless coverage area defined by the wireless router. Block 974 may involve accessing the wireless coverage area using a network identifier and a password. Block 976 may involve transmitting a notification to a client device served by the wireless coverage area. The notification indicates that the UAV has access to media content (e.g., one or more movies) requested by the client device. Block 978 may involve downloading the requested media content to the client device.

Figure 9D:
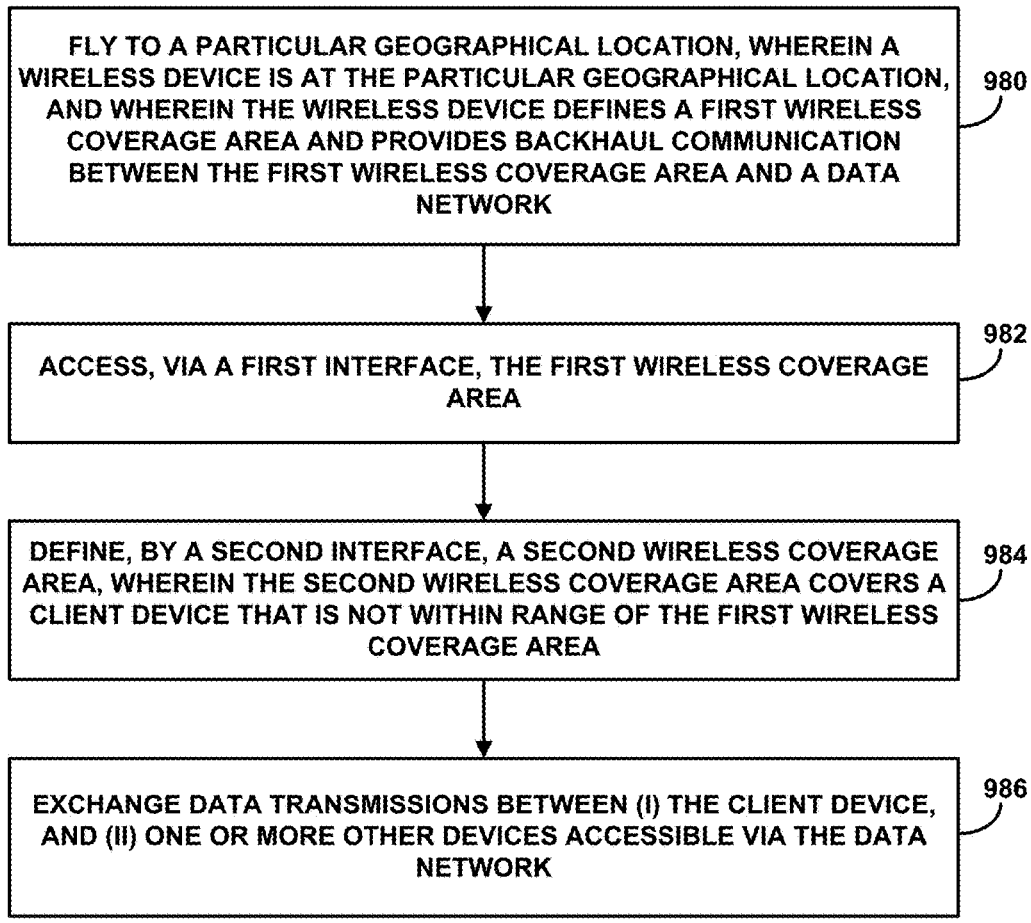
FIG. 9D is a flow chart, according to example embodiments.

FIG. 9D is a flow chart in accordance with example embodiments. The operations in this flow chart may be performed by components of UAV—particularly, by a computing unit (e.g., a processor with memory and other peripheral components) and communication unit of such a UAV. The embodiment illustrated by FIG. 9D involves a UAV providing relay wireless service between a client device and a wireless base station or router, where the backhaul link of the wireless base station or router is used to facilitate communication between the client device and a data network.

Block 980 may involve a UAV flying to a particular geographical location. A wireless device may be at the particular geographical location. The wireless device may define a first wireless coverage area and provide backhaul communication between the first wireless coverage area and a data network. The wireless device may be a cellular base station or a wireless router.

Block 982 may involve accessing, by a first interface of the UAV, the first wireless coverage area. Block 984 may involve defining, by a second interface the UAV, a second wireless coverage area. The second wireless coverage area may cover a client device that is not within range of the first wireless coverage area.

Block 986 may involve exchanging data transmissions between (i) the client device, and (ii) one or more other devices accessible via the data network. Exchanging the data transmissions may involve receiving, by the UAV and via the second wireless coverage area, data from the client device, and transmitting, by the UAV and via the first wireless coverage area, the data to the wireless device. Reception of the data by the wireless device may cause the wireless device to transmit, via the data network, the data to the one or more other devices. Alternatively or additionally, exchanging the data transmissions may involve receiving, by the UAV and via the first wireless coverage area, data from one of the one or more other devices, and transmitting, by the UAV and via the second wireless coverage area, the data to the client device.

Figure 10A:
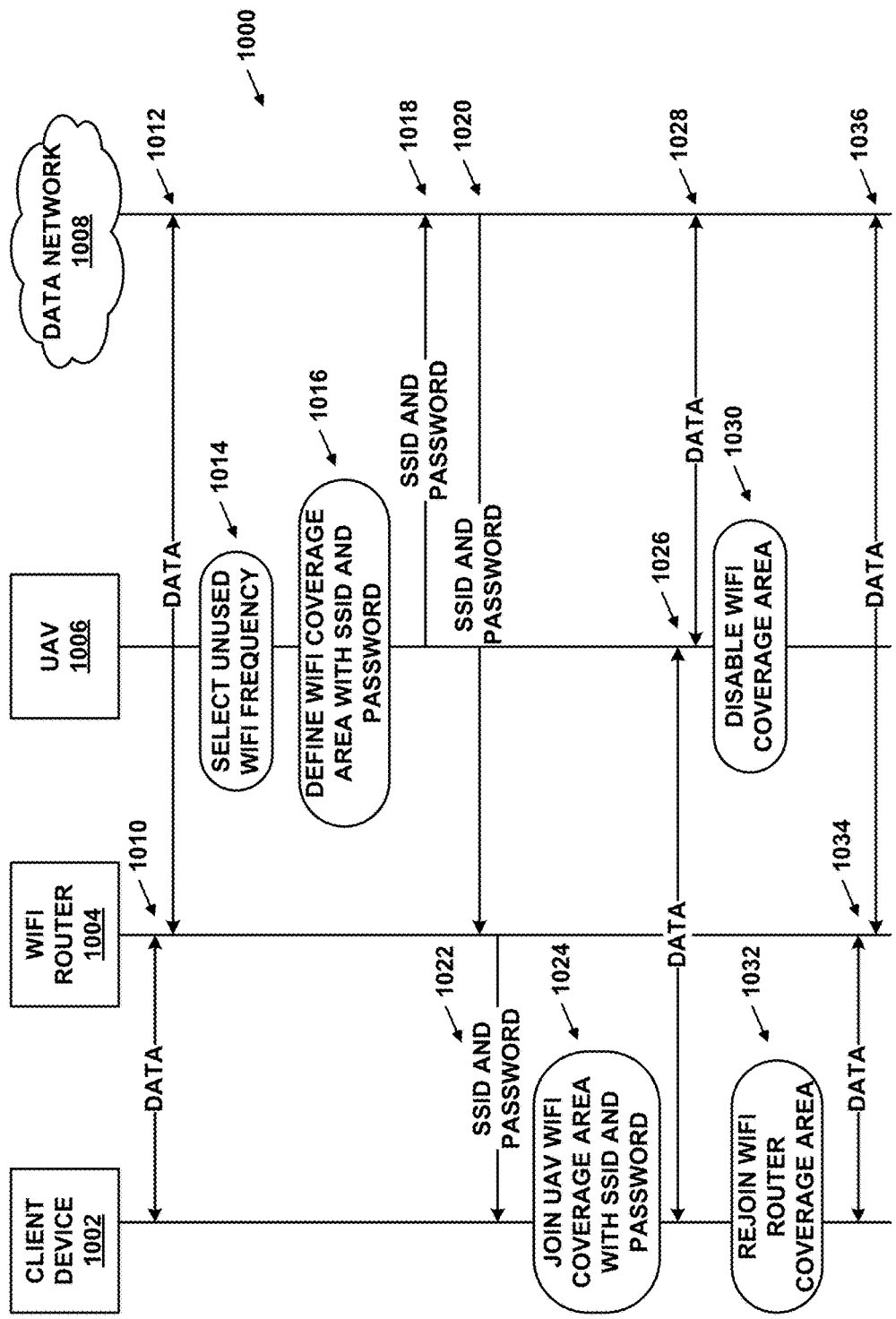
FIG. 10A is a message flow diagram, according to example embodiments.

FIG. 10A is a message flow diagram 1000 illustrating a UAV defining a new Wifi network at the target location. At steps 1010 and 1012, client device 1002 exchanges data with one or more devices via Wifi router 1004 and data network 1008. The data exchanged may be any type of transaction—web browsing, gaming, email, messaging, voice over IP, media streaming, file downloads, etc. In some embodiments, the backhaul link between Wifi router 1004 and data network 1008 may have limited capacity. As a result, client device 1002 may request augmented wireless coverage, and UAV 1006 may be deployed to provide this coverage.

At step 1014, after arriving in the vicinity of Wifi router 1004, UAV 1006 may select an unused Wifi frequency. UAV 1006 may scan a range of Wifi frequencies to determine which of these frequencies are used and which are unused in this location. From this range of frequencies, UAV 1006 may select one of the unused frequencies. UAV 1006 may also establish, or may have already established, a wireless backhaul link to data network 1008.

At step 1016, UAV 1006 may define a Wifi coverage area (which may also be referred to as a "Wifi network"). This coverage area may be defined using a particular SSID and password. The SSID and password may be (i) pre-loaded into UAV 1006 before UAV 1006 flies to the location, (ii) provided to UAV 1006, via data network 1008, by a server device (such as central dispatch system 408), or (iii) generated by UAV 1006. In the latter case, at step 1018, UAV 1006 may transmit the SSID and password, via data network 1008, to the server device. At steps 1020 and 1022, the server device may transmit the SSID and password to client device 1002 via data network 1008 and Wifi router 1004.

At step 1024, client device 1002 may join the Wifi coverage area defined by UAV 1006. Then, at steps 1026 or steps 1026 and 1028, client device 1002 may exchange data transmissions with UAV 1006. For instance, client device 1002 may download media content from UAV 1006, or client device 1002 may communicate with one or more other devices on data network 1008 via UAV 1006.

At step 1030, after some period of time either defined by the request for augmented wireless coverage or determined otherwise, UAV 1006 may disable its Wifi coverage area. At step 1032, possibly in response to determining that the Wifi coverage area of UAV 1006 is no longer available, client device 1002 may rejoin the Wifi coverage area of Wifi router 1004. Then, at steps 1034 and 1036, client device 1002 may once again exchange data with one or more devices via Wifi router 1004 and data network 1008. UAV 1006 may fly away from the vicinity of the Wifi network, perhaps back to a nest or on to another location at which to provide augmented wireless coverage.

Figure 10B:
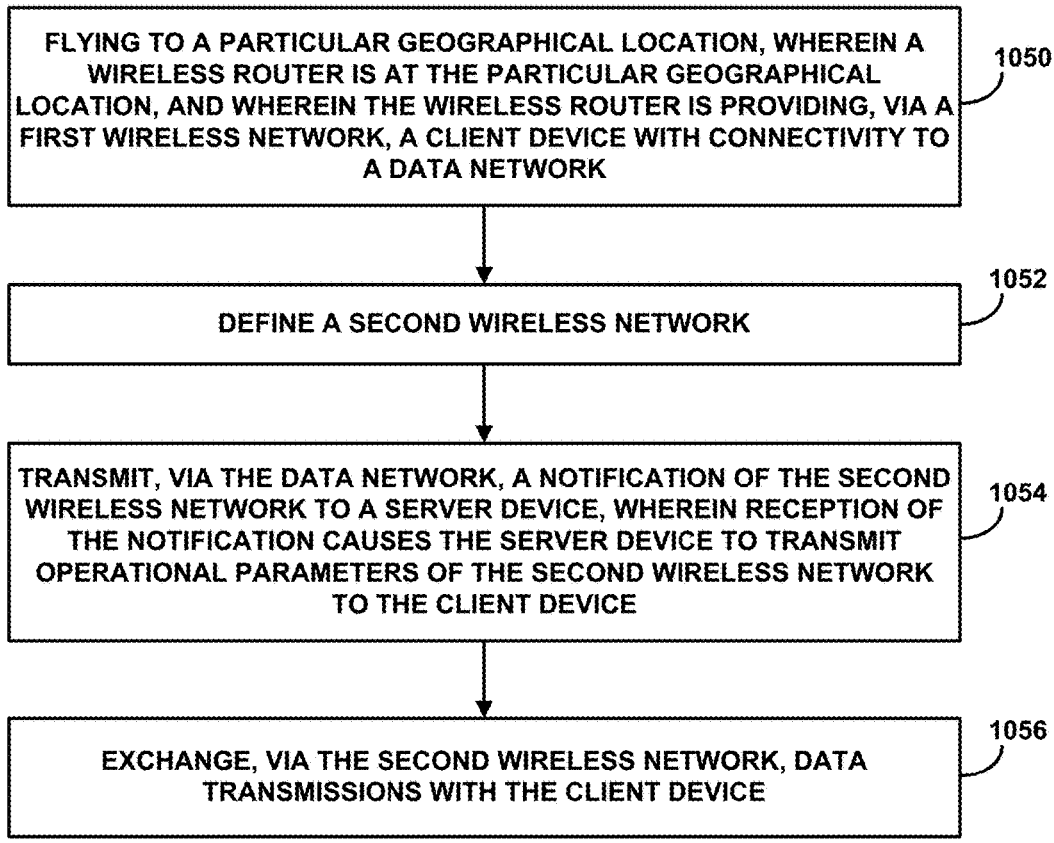
FIG. 10B is a flow chart, according to example embodiments.

FIG. 10B is a flow chart in accordance with example embodiments. The operations in this flow chart may be performed by components of UAV—particularly, by a computing unit (e.g., a processor with memory and other peripheral components) and communication unit of such a UAV Block 1050 may involve flying to a particular geographical location. A wireless router may be at the particular geographical location, and the wireless router may be providing, via a first wireless network, a client device with connectivity to a data network.

Block 1052 may involve defining a second wireless network. The second wireless network may be defined so that it does not interfere with the first wireless network. For instance, prior to defining the second wireless network, the UAV may scan a frequency range to identify a frequency not used by wireless networks near the particular geographical location. The second wireless network may be defined using the frequency.

Block 1054 may involve transmitting, via the data network, a notification of the second wireless network to a server device. Reception of the notification may cause the server device to transmit operational parameters of the second wireless network to the client device. Some embodiments may further involve, after transmitting the notification of the second wireless network to the server device, determining that the client device has joined the second wireless network.

The notification of the second wireless network may include the operational parameters of the second wireless network. For instance, where the second wireless network is a Wifi network, the operational parameters of the second wireless network may include an SSID and password for the second wireless network. Further, reception, by the client device, of the operational parameters of the second wireless network may cause the client device to join the second wireless network.

Block 1056 may involve exchanging, via the second wireless network, data transmissions with the client device. Alternatively or additionally, exchanging data transmissions with the client device may involve exchanging the data transmissions between (i) the client device, and (ii) one or more other devices accessible via the data network. Further embodiments may involve disabling the second wireless network after some period of time, which may cause the client device to rejoin the first wireless network.

Figure 11A:
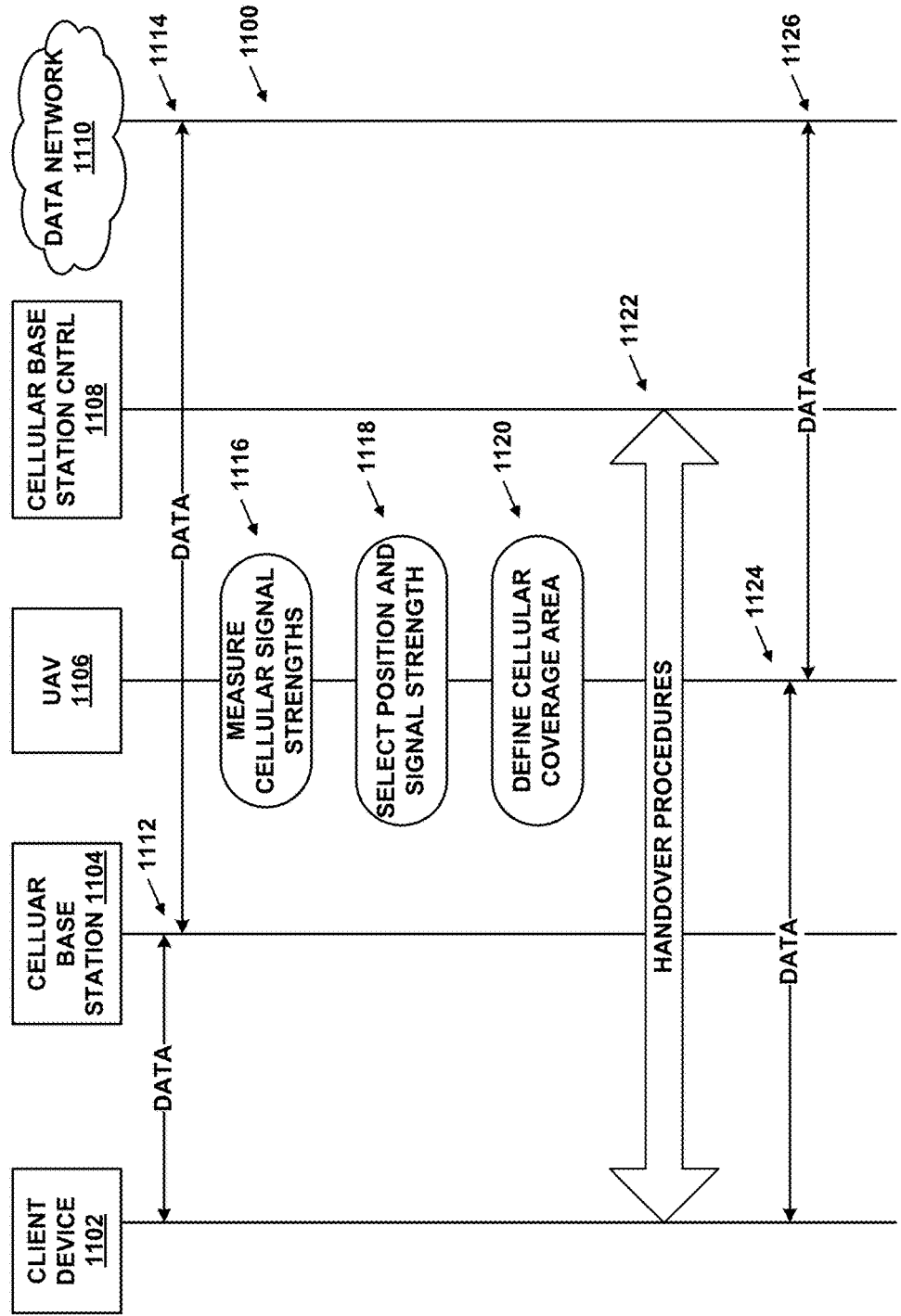
FIG. 11A is a message flow diagram, according to example embodiments.
Figure 11B:
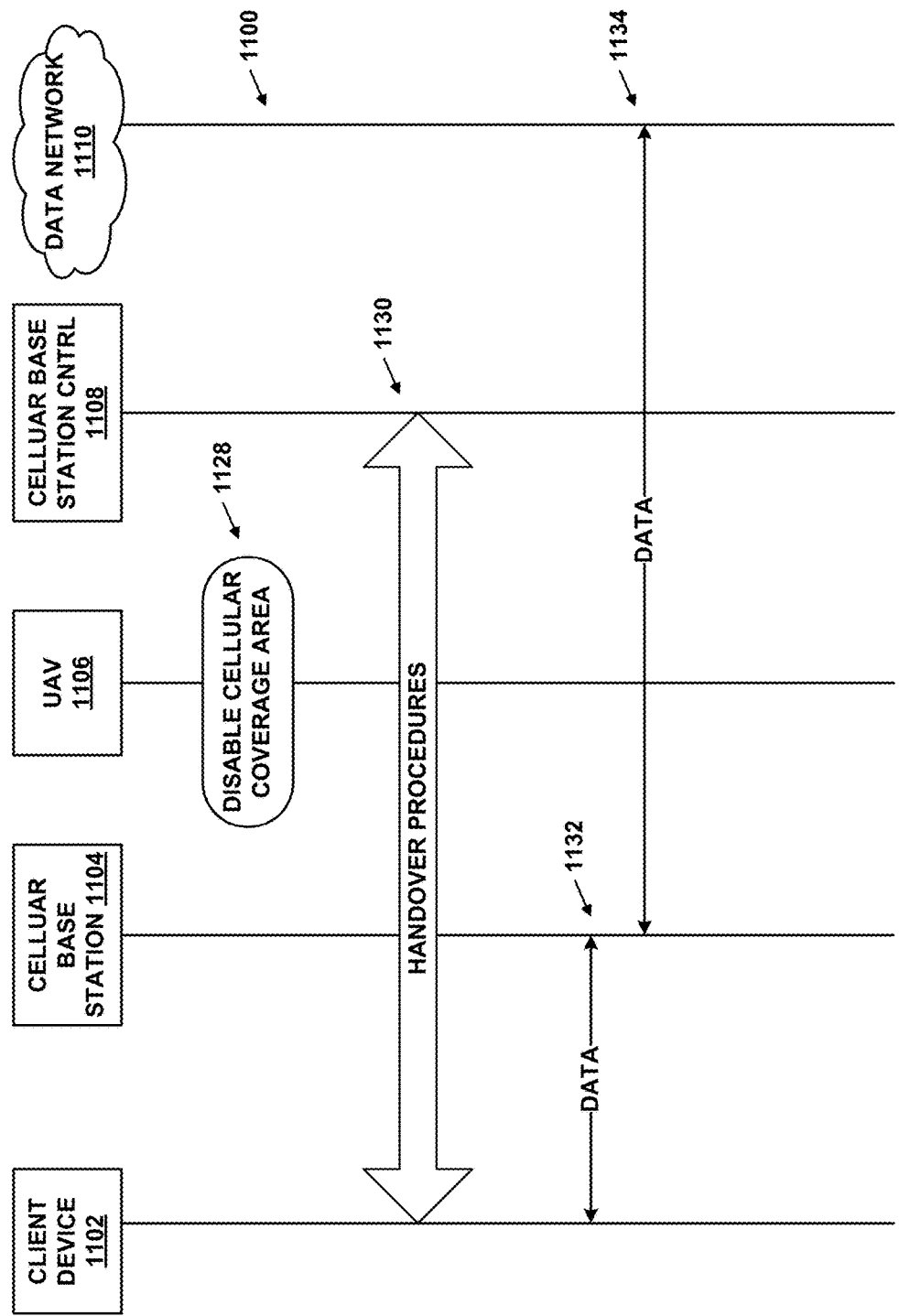
FIG. 11B is a message flow diagram, according to example embodiments.

FIGS. 11A and 11B are a message flow diagram 1100 illustrating a UAV defining a new cellular wireless coverage area at a target location. The steps of these figures may be carried out, in part or as a whole, in response to a request from a cellular service provider or a client device. For instance, a cellular service provider may determine that one or more of its base stations at or nearby the target location are overloaded, or the utilization thereof is above a threshold percentage (e.g., greater than 50%, 70%, 90%, etc.). Or, the cellular service provider may determine that there is a gap in its wireless coverage at the target location. In response, the cellular service provider may request UAV deployment to the target location so that the cellular wireless coverage at the target location can be augmented. Likewise, the user of a client device may decide that the cellular coverage at the target location is insufficient for the user's needs. In response, the user may request, perhaps via the client device, augmented cellular wireless coverage at the target location. Other embodiments are possible. Advantageously, any of these deployments may reduce or eliminate roaming charges that would normally be paid by the cellular service provider or the user.

Regardless, at steps 1112 and 1114, client device 1102 exchanges data with one or more devices via cellular base station 1104 and data network 1110. The data exchanged may be any type of transaction—web browsing, gaming, email, messaging, voice over IP, media streaming, file downloads, etc. In some embodiments, the backhaul link between cellular base station 1104 and data network 1110 may have limited capacity. As a result, client device 1102 may request augmented wireless coverage, and UAV 1106 may be deployed to provide this coverage.

At step 1116, after arriving in the vicinity of client device 1102, UAV 1106 may measure the strengths of cellular signals that it can receive from one or more cellular wireless coverage areas. One of these coverage areas may be the coverage area defined by cellular base station 1104 that is being used by client device 1102. When UAV 1106 is close enough to client device 1102 (e.g., within a few hundred feet), it is likely that UAV 1106 receives these signals with strengths that are similar to the strengths at which client device 1102 receives the signals. Thus, UAV 1106 may use its measurements to estimate the strength at which client device 1102 is receiving the signals.

At step 1118, UAV 1106 may select a position for itself, as well as a signal strength. Based on the measured signal strengths, UAV 1106 may select a three dimensional position. For instance, if the measured signal strengths are high, UAV 1106 may select a position that is laterally and/or attitudinally closer to client device 1102, and then fly to this position. Also based on the measured signal strengths, UAV 1106 may select a signal strength so that UAV 1106 can define a cellular wireless coverage area with a high enough power that client device 1102 is likely to hand over to UAV 1106. UAV 1106 may also associate itself with cellular base station controller 1108, so that cellular base station controller 1108 considers UAV 1106 to be a "base station" and therefore part of the cellular network.

At step 1120, UAV 1106 may define a cellular wireless coverage area with the selected signal strength. Possibly as a result of UAV 1106 doing so, client device 1102 may conduct procedures with cellular base station 1104 and cellular base station controller 1108 to hand over to the wireless coverage area of UAV 1106. For instance, client device 1102 may measure the strength at which it receives signals from the wireless coverage area of UAV 1106 and determine that it is greater than the received signal strengths of other wireless coverage areas, including the wireless coverage area of cellular base station 1104. In particular, if the received signal strength of the wireless coverage area of UAV 1106 is greater by a pre-determined margin than at least some of these other signal measured signal strengths, client device 1102 may initiate a handover from cellular base station 1104 to UAV 1106.

At step 1124 or steps 1124 and 1126, client device 1102 may exchange data transmissions with UAV 1106. For instance, client device 1102 may download media content from UAV 1106, or client device 1102 may communicate with one or more other devices on data network 1110 via UAV 1106.

Turning to FIG. 11B, at step 1128, after some period of time either defined by the request for augmented wireless coverage or determined otherwise, UAV 1106 may disable its cellular wireless coverage area. At step 1130, possibly in response to determining that the cellular wireless coverage area of UAV 1106 is no longer available, client device 1102 may initiate a handover from UAV 1106 to cellular base station 1104. Then, at steps 1132 and 1134, client device 1102 may once again exchange data with one or more devices via cellular base station 1104 and data network 1110. UAV 1106 may fly away from the vicinity of client device 1102, perhaps back to a nest or on to another location at which to provide augmented wireless coverage.

Figure 11C:
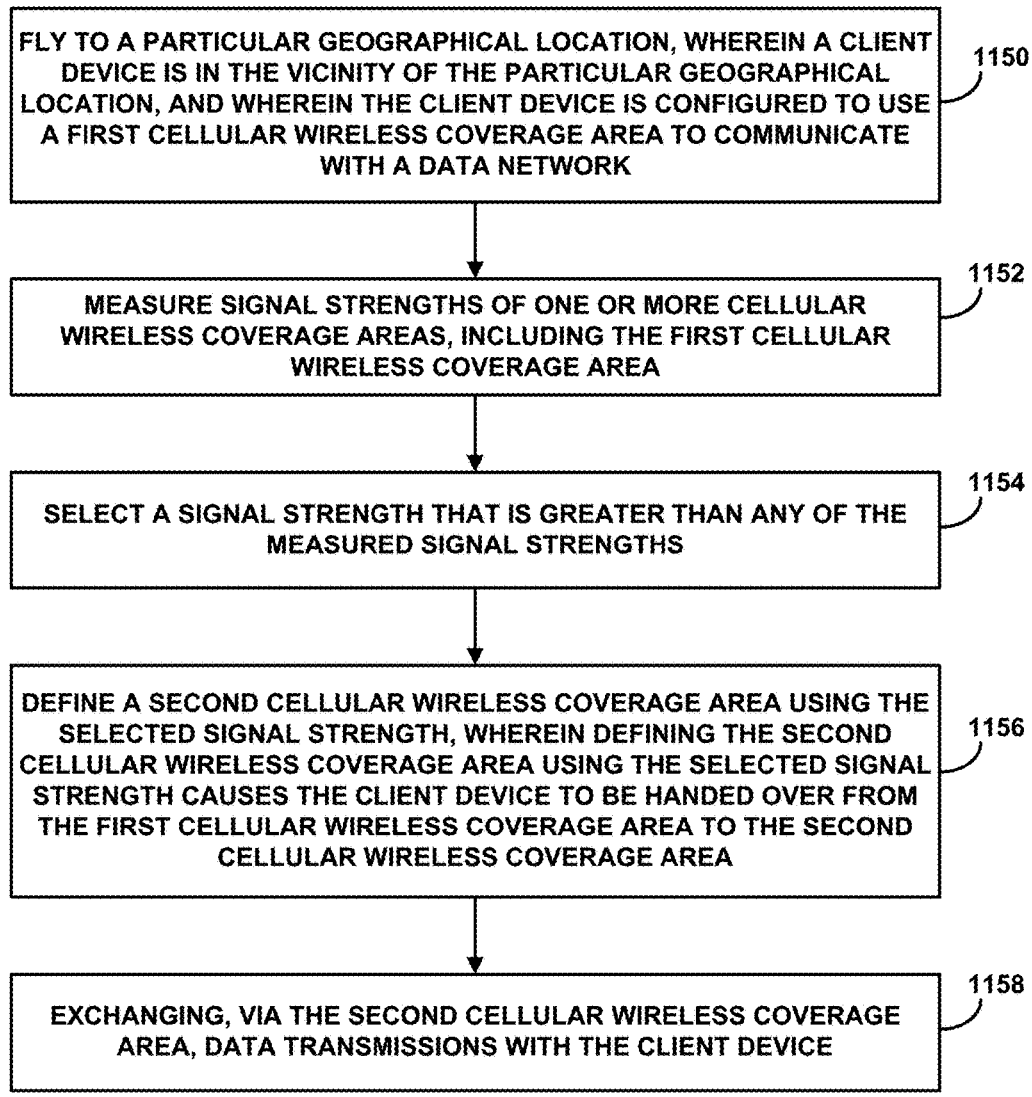
FIG. 11C is a flow chart, according to example embodiments.

FIG. 11C is a flow chart in accordance with example embodiments. The operations in this flow chart may be performed by components of UAV—particularly, by a computing unit (e.g., a processor with memory and other peripheral components) and communication unit of such a UAV Block 1150 may involve flying to a particular geographical location. A client device may be in the vicinity of the particular geographical location, and the client device may be configured to use a first cellular wireless coverage area to communicate with a data network.

Block 1152 may involve measuring signal strengths of one or more cellular wireless coverage areas, including the first cellular wireless coverage area.

Block 1154 may involve selecting a signal strength that is greater than any of the measured signal strengths. The selected signal strength may be greater than any of the measured signal strengths by a pre-determined margin. The pre-determined margin may be at least 3 dB or at least 5 dB, as two possible examples. Also, based on the measured signal strengths, the UAV may adjust at least one of (i) a height of the UAV above the ground, or (ii) a lateral position of the UAV, so that the UAV is closer to the client device.

Block 1156 may involve defining a second cellular wireless coverage area using the selected signal strength. Defining the second cellular wireless coverage area using the selected signal strength may cause the client device to be handed over from the first cellular wireless coverage area to the second cellular wireless coverage area. Some embodiments may involve, after defining the second cellular wireless coverage area, determining that the client device has joined the second cellular wireless coverage area.

While defining the second cellular wireless coverage area, the UAV may repeatedly measure the signal strengths of one or more cellular wireless coverage areas. Based on the repeatedly measured signal strengths, the UAV may adjust the signal strength of the second cellular wireless coverage area, so that the signal strength of the second cellular wireless coverage area remains greater (e.g., greater by a pre-defined margin) than any of the repeatedly measured signal strengths.

Block 1158 may involve exchanging, via the second cellular wireless coverage area, data transmissions with the client device. Exchanging the data transmissions with the client device may involve exchanging the data transmissions between (i) the client device, and (ii) one or more other devices accessible via the data network. Further embodiments may involve disabling the second cellular wireless coverage area, which may cause the client device to hand over to the first cellular wireless coverage area.

6. UAV Deployment for Augmenting Non-Wireless Data Transfer

In addition or as an alternative to providing augmented wireless coverage to one or more devices, a UAV may provide augmented non-wireless data transfer for these device(s). For instance, a client device may transmit a request (e.g., to access system 402 and/or central dispatch system 408) for particular media content (e.g., a movie). A UAV may be selected (using for instance, any of the UAV selection criteria described herein) to serve the request, and the request may be forwarded to the selected UAV's nest. Mechanisms at the nest, such as a robotic system, may automatically load the particular media content onto a portable storage device. The portable storage device may be a hard drive, flash drive, compact disc, Blu-ray disc, memory stick, memory card, dongle, or some other form of storage. The portable storage device may be placed in an enclosure of the UAV, such as enclosure 135.

The UAV may be instructed to fly to a location associated with the client device. Once at this location, the UAV may deliver the portable storage device. For instance, the UAV may drop or place the portable storage device on a surface (e.g., in a mailbox, on a doorstep, on a table, etc.) at the location. Once the delivery is made, the client device may be notified of the delivery, for instance via email or text message.

Then, the UAV may either fly back to the nest, or to another location to make another delivery. After some period of time, the same or a different UAV may arrive at the location to collect the portable storage device. In some embodiments, a UAV may deliver and/or collect a number of portable storage devices to/from a number of locations on one trip away from its nest.

These embodiments may be desirable in locations (e.g., islands, remote locations, rural locations, or locations in developing countries) where it is difficult for a UAV to maintain a high-speed wireless backhaul link. Delivery of a portable storage device may effectively provide virtually unlimited data transfer on demand.

Figure 12:
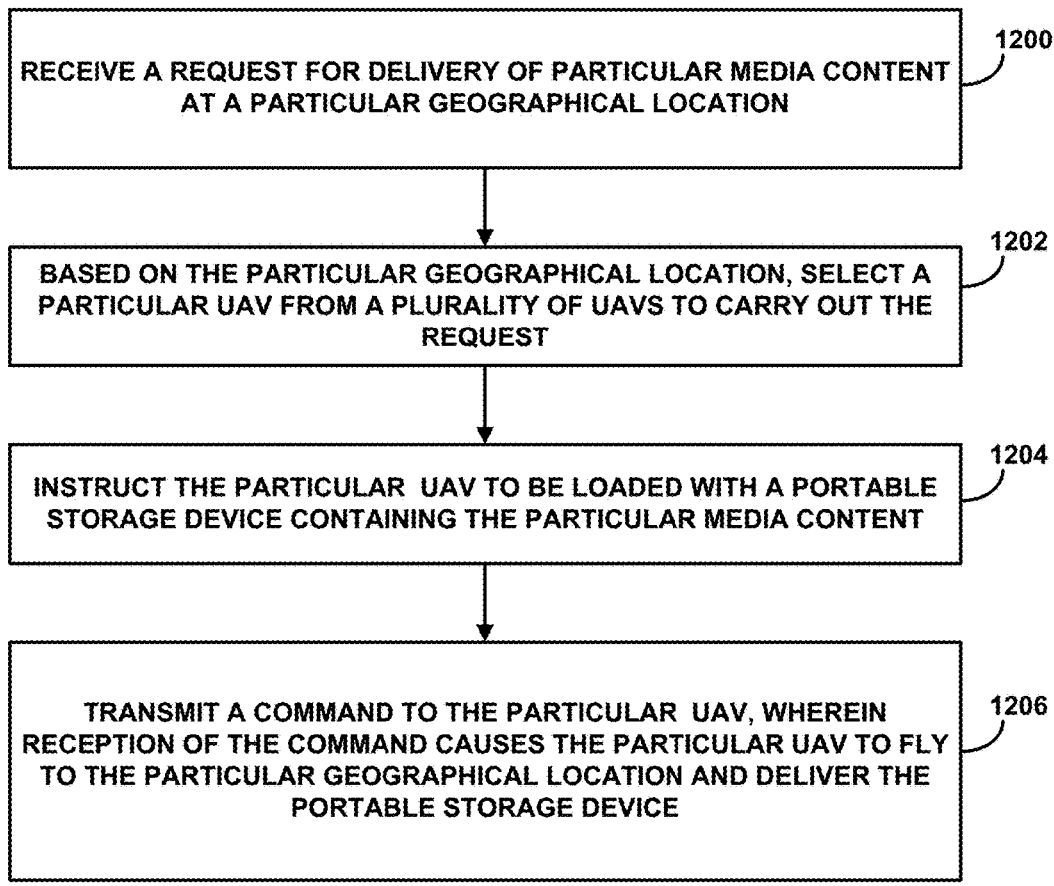
FIG. 12 is a flow chart, according to example embodiments.

FIG. 12 is a flow chart in accordance with example embodiments. The operations in this flow chart may be performed by a computing device of a computing system associated with a UAV, such as a UAV controller device that controls the movement and operation of one or more UAVs.

Block 1200 may involve receiving a request for delivery of particular media content at a particular geographical location. Block 1202 may involve, possibly based on the particular geographical location, selecting a particular UAV from a plurality of UAVs to carry out the request.

Block 1204 may involve instructing the particular UAV to be loaded with a portable storage device containing the particular media content. Instructing the particular UAV to be loaded with the portable storage device containing the particular media content may involve instructing a media content manipulation device to automatically load the particular media content on the portable storage device, and instructing a payload management device to automatically place the portable storage device in an enclosure of the particular UAV. In some embodiments, at least one of the media content manipulation device or the payload management device includes a robotic arm.

Block 1206 may involve transmitting a command to the particular UAV, wherein reception of the command causes the particular UAV to fly to the particular geographical location and deliver the portable storage device. In cases where the request was received from a client device, the some embodiments may further involve receiving an indication that the portable storage device has been delivered to the particular geographic location, and possibly in response to receiving the indication, transmitting a message to the client device. The message may indicate that the portable storage device has been delivered to the particular geographic location. The message may be an email message or a text message.

7. Further Advantages

In addition to the embodiments described above, UAV based network capacity augmentation or UAV based data transfer augmentation may have other features, aspects and/or advantages. A non-exhaustive discussion of these follows. Each of the features, aspects and/or advantages may be combined with any one or more of the embodiments herein.

A. Data Backup

UAVs may facilitate on-demand or periodic data backups. As an example, suppose that a client device stores a large amount of data (e.g., several hundreds of gigabytes or terabytes). Backing up this data to a remote location over a broadband network may take days, weeks, or months to complete. However, a UAV may be able to provide a high-speed uplink for the client device such that this backup can be completed in minutes or hours.

Thus, the client device might request augmented wireless coverage from a UAV, and use this coverage to perform an on-demand backup of its data. Alternatively, the client device may have a pre-determined backup schedule (e.g., once a week, once a month, etc.) when the UAV flies to the location of the client device and the client device performs the backup via the UAV.

B. UAV to UAV Communication

UAVs in the same general vicinity may be able to communicate with one another to coordinate and improve overall wireless coverage. For instance, two UAVs providing augmented cellular wireless coverage in the vicinity may communicate so that they cover locations where demand for cellular wireless coverage is most likely needed.

As one possible example, if the demand for augmented cellular wireless coverage is localized in one specific area that can be covered by the coverage footprint of a single UAV, both UAVs may provide augmented cellular wireless coverage to this area so that neither is overloaded. As another possible example, if the demand for augmented cellular wireless coverage is spread out over several areas that cannot be covered by the coverage footprint of a single UAV, the two UAVs may coordinate with one another so that at least some of these multiple areas are covered.

C. Ad-Hoc Wireless Coverage for First Responders

In the event of an emergency, first responders (e.g., law enforcement, firefighters, emergency medical services, etc.) may need to communicate with one another and with other entities. Some of these communications may be critical. However, certain types of disasters, such as hurricanes and earthquakes, may disable or limit existing telecommunication services.

One possible way of providing first responders with a way to communicate is to deploy one or more UAVs to define wireless coverage areas in the vicinity of the first responders. These UAVs may be configured to only provide coverage to the client devices of the first responders (e.g., using a whitelist to block other devices from accessing the UAVs). In this fashion, the first responders may be able to communicate via voice, video, or data with one another, as well as their headquarters and with officials in other locations. Further, for first responders that move about a broad geographical area, one or more UAVs may follow these first responders so that coverage is more likely to be maintained.

D. Local Content Delivery Networks

A content delivery network (CDN) is a geographic deployment of server devices in order to place these devices physically close to users. In this way, these users can be served by a server device that is nearest or nearby the users rather than having to transmit content to the users over a wide area network. As an example, media streaming or download services may use CDNs, and thus geographically distribute (cache) their media content to locations in major cities and Internet service provider (ISP) points of presence. As a result, when a user streams or downloads particular video content, a local copy of the video content may be transmitted to the user over a local area network or an access network.

UAVs may be used to perform similar operations. As an example, one or more UAVs may be pre-loaded with copies of the 10, 25, 50, etc. most popular movies, and deployed to local neighborhoods. As requests for streaming or download of these movies arrive, the UAV may move about to deliver the movies to users. By replicating copies of the same popular media content across multiple UAVs, these UAVs may form a type of on-demand, reconfigurable CDN.

E. Scheduled Augmented Wireless Coverage

In any of the embodiments above, a UAV may be scheduled to provide augmented wireless coverage to multiple locations on a regular or semiregular basis. For instance, a UAV May be deployed to several target locations in a specific order. At each target location, the UAV may provide augmented wireless coverage for a period of time. The UAV may fly from target location to target location without returning to a nest. This activity may be scheduled to occur regularly, such as once a day, or on an ad hoc basis. After servicing the final target location, the UAV may then return to a nest.

F. Dynamic Deployment of Self-Powered Base Stations

In combination with any of the above embodiments, or as a distinct embodiment, one or more UAVs may be used to deploy self-powered wireless base stations to target locations that might benefit from augmented wireless coverage. The same or similar procedures may be used to deploy wireless repeaters, and for sake of simplicity, the term "base station" may be used to refer to either base stations, wireless repeaters, or both.

These base stations may be of a portable form factor, perhaps no bigger than 18 inches by 12 inches by 12 inches and weighing 10 pounds or less. In some cases, such a base station might be no bigger than 12 inches by 6 inches by 6 inches and weigh 5 pounds or less. Other dimensions and weights are possible. Notably, these base stations may be small and light enough to be carried by a UAV.

A base station may be self-powered. Thus, the base station may contain batteries, or some other form of power. For instance, some base stations may include photovoltaic solar panels that allow the base stations to generate electrical current from sunlight.

A base station may also include one or more mechanisms to anchor itself to a surface, so that the base station is relatively stable during operation. These mechanisms may include, but are not limited to, suction cups, high-friction rubber, adhesives, or magnets. When placed on a ground surface, a base station equipped with pistons might sink hooks or grapnels into the surface to secure the base station to the ground. Other anchoring mechanisms are possible.

Such base stations may also include at least one wireless transceiver. In some embodiments, a base station might include a cellular transceiver, for communicating with client devices, as well as a line-of-sight transceiver for backhaul communications with a data network or with other base stations.

Two issues in particular may be addressed when deploying these base stations—base station placement and base station inter-communication.

Prior to or during deployment of a base station, a UAV may be instructed where to deposit the base station. For instance, the UAV may be instructed to place the base station in a particular location. In other embodiments, the UAV may be given one or more desirable locations, and instructed to place the base station as close to any of these locations as possible. For instance, the UAV or UAV controller may calculate a cost function associated with various placements, where the "cost" of a placement grows with the square of the distance from the given desirable locations. The desirable locations may be selected based on their ability to physically support a base station (e.g., having a stable, flat surface), altitude, and line-of-sight paths to other wireless infrastructure. Further, these locations may be selected in order to distribute the base stations so that a broad overall wireless coverage can be maintained.

In some cases, UAVs may move base stations between locations in order to improve coverage. For instance, as the traffic loads on various base stations change, some base stations may be positioned so that the traffic loads are more balanced. In other situations, base stations may be placed in anticipation of future traffic demands. For example, if a sporting event is scheduled to take place at a particular time in a stadium, one or more base stations may be deployed to the vicinity of the stadium in order to handle the expected load.

Once deployed, base stations may use their line-of-sight interfaces to discover one another, and potentially establish a mesh network. In such a mesh network, not all base stations may have direct backhaul connectivity to a data network. Instead, communications from client devices may be routed between one or more base stations until these communications reach a base station with such backhaul capabilities. Similar routing may occur for communications from the data network to a client device.

One possible advantage of such arrangements is that the high cost of deploying base stations is reduced. Further, as noted above, once deployed, the base stations can be moved about in order to maintain coverage goals.

G. UAV-Based Wireless Coverage Mapping

In combination with any of the above embodiments, or as a distinct embodiment, one or more UAVs may be used to map existing wireless coverage in the vicinity of a target location. For instance, a UAV or group of UAVs may fly in a pattern throughout such a vicinity, measuring the extent of wireless coverage across one or more frequencies (e.g., LTE frequencies and/or Wifi frequencies). These measurements may take the form of signal strength readings.

The wireless coverage may include coverage from terrestrial base stations and/or fixed or mobile UAV base stations. In other embodiments, the UAV(s) may search for specific networks (e.g., wireless coverage areas with specific cellular IDs or Wifi networks with specific SSIDs).

From these measurements, the UAV(s), or some other computing device, may generate a heat map of the wireless coverage. For instance, the heat map may divide the vicinity of a target location into segments (e.g., blocks of 100 meters by 100 meters) and assign a number to each segment representing the measured signal strength in each segment. The measured signal strength can be, for example, an average of the signal strength measurements taken in the segment. The aggregate of these measurements can be formed into a representation of a map, indicating where wireless coverage is strong, adequate, weak, or non-existent. In segments with weak or non-existent wireless coverage, UAV(s) may be used to deploy wireless coverage in accordance with the embodiments above.

In some embodiments, these measurements may be taken several times a day or after wireless coverage in the area is known to change (e.g., a base station has been added to or removed from the area).

H. UAV-Based Wireless Demand Mapping

In combination with any of the above embodiments, or as a distinct embodiment, one or more UAVs may be used to map capacity demand in the vicinity of a target location. For instance, possibly in response to requests for augmented wireless capacity or augmented non-wireless data transfer, the UAVs serving these requests (or other UAVs) may record the locations of these requests and/or the amount of augmented capacity requested or used.

The UAV(s), or some other computing device, may generate a heat map of the demand. For instance, the heat map may divide the vicinity of a target location into segments (e.g., blocks of 100 meters by 100 meters) and assign a number to each segment representing the relative or absolute demand requested by client devices located in the segment. The number can represent, for example, a number of capacity requests per hour, per day, etc., and/or an extent of requested capacity (e.g., in bits per second) per hour, per day, etc. The aggregate of these measurements can be formed into a representation of a map, indicating where demand is high, moderate, low, or non-existent. In segments with moderate or high demand, UAV(s) may be deployed proactively to be available to provide wireless coverage in accordance with the embodiments above.

In particular embodiments, wireless service providers (e.g., cellular or Wifi providers) may use this technique to determine where to deploy more terrestrial base stations or other forms of additional wireless coverage. In some cases, the UAV system may recommend deployment of a UAV nest near high-demand locations so that UAVs can rapidly respond to requests.

In alternative or additional embodiments, four-dimensional representations of the actual network capacity and the desired network capacity at points of demand and/or control (e.g., target locations, base stations, routers, etc.) may be developed. The four dimensions may include, for example, latitude, longitude, and altitude of a point of demand and/or control, and time of the request. Additional factors (which may be viewed as further dimensions) include actual capacity and desired capacity of the point of demand and/or control at the time of the request. These representations may be derived from requests for augmented capacity, and/or from mapping the existing capacity by using capacity testing tools. From the representations, determinations regarding the placement of terrestrial base stations or other forms of additional wireless coverage may be made. Additionally, profiles of end user and/or client device communication behavior may be developed as well.

8. Example Server Device

Figure 13:
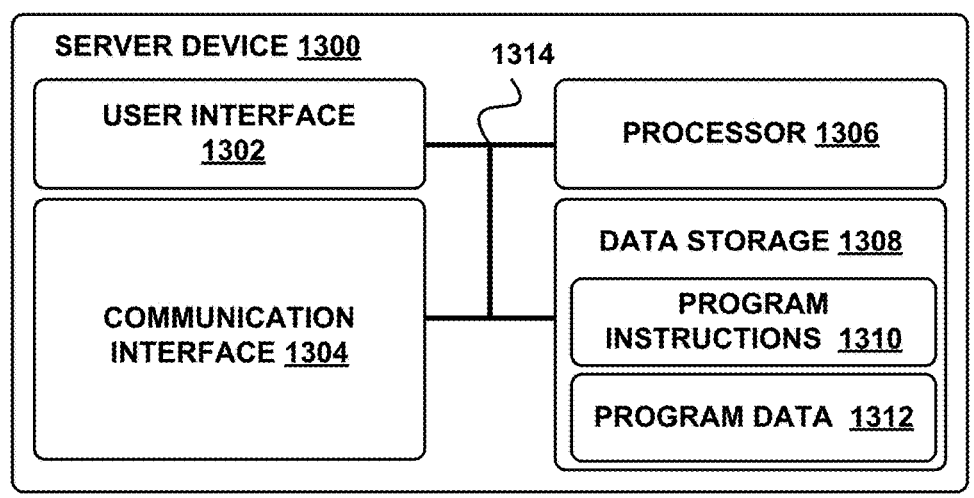
FIG. 13 is a block diagram of a computing device, according to example embodiments.

FIG. 13 is a block diagram of a server device in accordance with an example embodiment. In particular, server device 1300 shown in FIG. 13 can be configured to perform one or more functions of any server device disclosed herein, including access system 402, central dispatch system 408, or any other UAV controller device. Server device 1300 may include a user interface 1302, a communication interface 1304, processor 1306, and data storage 1308, all of which may be linked together via a system bus, network, or other connection mechanism 1314.

User interface 1302 may include user input devices such as a keyboard, a keypad, a touch screen, a computer mouse, a track ball, a joystick, and/or other similar devices, now known or later developed. User interface 1302 may also include user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 1302 may be configured to generate audible output(s), via a speaker, speaker jack, audio output port, audio output device, earphones, and/or other similar devices, now known or later developed. In some embodiments, user interface 1302 may include software, circuitry, or another form of logic that can transmit data to and/or receive data from external user input/output devices.

Communication interface 1304 may include one or more wireless interfaces and/or wireline interfaces that are configurable to communicate via a network. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, an LTE transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

Processor 1306 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 1306 may be configured to execute computer-readable program instructions 1310 that are contained in data storage 1308, and/or other instructions, to carry out various operations described herein.

Thus, data storage 1308 may include one or more non-transitory computer-readable storage media that can be read or accessed by processor 1306. The one or more computer-readable storage media may include volatile and/or non-volatile storage components, such as optical, magnetic, organic or other memory or disc storage, which can be integrated in whole or in part with processor 1306. In some embodiments, data storage 1308 may be implemented using a single physical device (e.g., one optical, magnetic, organic or other memory or disc storage unit), while in other embodiments, data storage 1308 may be implemented using two or more physical devices. Data storage 1308 may also include program data 1312 that can be used by processor 1306 to carry out operations described herein.

9. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    receiving a request to provide unmanned aerial vehicle (UAV) based wireless coverage to a geographical location;
    in response to the request, flying, by a UAV, to the geographical location;
    defining, by a first wireless interface of the UAV, a wireless coverage area that covers at least part of the geographical location;
    establishing, by a second wireless interface of the UAV, a wireless backhaul link to a data network;
    providing, by way of the wireless coverage area, wireless data transfer services to a client device in the geographical location, wherein the wireless data transfer services allow the client device to exchange data communication with the data network via the UAV, wherein the client device is disposed on a bus or train, wherein providing the wireless data transfer services to the client device comprises the UAV maintaining an altitude, wherein the altitude is selected based on tradeoffs between a footprint of the wireless coverage area and a data rate of the wireless data transfer services; and
    following, by the UAV, a route of the bus or train to continue to provide the wireless data transfer services.

2. The method of claim 1, further comprising:
    after providing the wireless data transfer services, flying, by the UAV, to a different geographical location.

3. The method of claim 1, wherein the wireless backhaul link is between the UAV and a terrestrial base station.

4. The method of claim 1, wherein the UAV is a first UAV, and wherein the wireless backhaul link is between the first UAV and a second UAV.

5. The method of claim 4, wherein the second UAV operates at a higher altitude than the first UAV.

6. The method of claim 1, wherein the first wireless interface is either a Wifi interface or a cellular interface.

7. The method of claim 1, wherein the second wireless interface is either a Wifi interface, a line-of-sight interface or a cellular interface.

8. The method of claim 1, wherein, prior to providing wireless data transfer services to the client device in the particular geographical location, the client device was in communication with a particular server device, and wherein providing wireless data transfer services to the client device in the particular geographical location comprises exchanging the data communication to and from the particular server device via the UAV.

9. The method of claim 1, wherein the client device is also in coverage range of a cellular wireless coverage area, and wherein the wireless backhaul link provides a greater rate of data communication between the client device and the data network than the cellular wireless coverage area.

10. The method of claim 1, wherein the altitude is selected based also on a remaining flight time of the UAV or wireless transmit power consumed to provide the wireless data transfer services.

11. An article of manufacture including a non-transitory computer-readable medium, having stored thereon program instructions that, upon execution by a processor of an unmanned aerial vehicle (UAV), cause the UAV to perform operations comprising:
    receiving a request to provide UAV based wireless coverage to a geographical location;
    in response to the request, flying to the geographical location;
    defining, by a first wireless interface of the UAV, a wireless coverage area that covers at least part of the geographical location;
    establishing, by a second wireless interface of the UAV, a wireless backhaul link to a data network;
    providing, by way of the wireless coverage area, wireless data transfer services to a client device in the geographical location, wherein the wireless data transfer services allow the client device to exchange data communication with the data network via the UAV, wherein the client device is disposed on a bus or train, wherein providing the wireless data transfer services to the client device comprises the UAV maintaining an altitude, wherein the altitude is selected based on tradeoffs between a footprint of the wireless coverage area and a data rate of the wireless data transfer services; and
    following a route of the bus or train to continue to provide the wireless data transfer services.

12. The article of manufacture of claim 11, the operations further comprising:
    after providing the wireless data transfer services, flying to a different geographical location.

13. The article of manufacture of claim 11, wherein the wireless backhaul link is between the UAV and a terrestrial base station.

14. The article of manufacture of claim 11, wherein the UAV is a first UAV, and wherein the wireless backhaul link is between the first UAV and a second UAV.

15. The article of manufacture of claim 14, wherein the second UAV operates at a higher altitude than the first UAV.

16. The article of manufacture of claim 11, wherein, prior to providing wireless data transfer services to the client device in the particular geographical location, the client device was in communication with a particular server device, and wherein providing wireless data transfer services to the client device in the particular geographical location comprises exchanging the data communication to and from the particular server device via the UAV.

17. The article of manufacture of claim 11, wherein the client device is also in coverage range of a cellular wireless coverage area, and wherein the wireless backhaul link provides a greater rate of data communication between the client device and the data network than the cellular wireless coverage area.

18. A method comprising:
 receiving, by an unmanned aerial vehicle (UAV) controller device, a request to provide unmanned aerial vehicle (UAV) based wireless coverage to a particular geographical location; and
 in response to the request, the UAV controller device causing:
  a UAV to fly to the particular geographical location,
  a first wireless interface of the UAV to define a wireless coverage area that covers at least part of the particular geographical location,
  a second wireless interface of the UAV to establish a wireless backhaul link to a data network,
  the UAV to provide, by way of the wireless coverage area, wireless data transfer services to a client device in the particular geographical location, wherein the wireless data transfer services allow the client device to exchange data communication with the data network via the UAV, and wherein the client device is disposed on a bus or train, wherein providing the wireless data transfer services to the client device comprises the UAV maintaining an altitude, wherein the altitude is selected based on tradeoffs between a footprint of the wireless coverage area and a data rate of the wireless data transfer services, and
  the UAV to follow a route of the bus or train to continue to provide the wireless data transfer services.

19. The article of manufacture of claim 11, wherein the altitude is selected based also on a remaining flight time of the UAV or wireless transmit power consumed to provide the wireless data transfer services.

20. The method of claim 18, wherein the altitude is selected based also on a remaining flight time of the UAV or wireless transmit power consumed to provide the wireless data transfer services.

* * * * *